United States Patent
Hwang et al.

(10) Patent No.: US 10,929,078 B2
(45) Date of Patent: Feb. 23, 2021

(54) ELECTRONIC APPARATUS FOR GENERATING SCREEN IMAGE TO BE DISPLAYED BY DISPLAY APPARATUS AND CONTROL METHOD THEREOF

(71) Applicant: SAMSUNG ELECTRONICS CO., LTD., Suwon-si (KR)

(72) Inventors: Sung-jun Hwang, Suwon-si (KR); Dong-hun Shin, Seoul (KR); Dae-wung Kim, Seoul (KR); Jun-yong Park, Suwon-si (KR); Young-ah Lee, Seoul (KR); Donghyeon Kim, Flushing, NY (US); Seok-ho Ban, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 114 days.

(21) Appl. No.: 16/213,384

(22) Filed: Dec. 7, 2018

(65) Prior Publication Data
US 2019/0204880 A1    Jul. 4, 2019

Related U.S. Application Data

(60) Provisional application No. 62/613,516, filed on Jan. 4, 2018.

(30) Foreign Application Priority Data

Mar. 2, 2018 (KR) .......... 10-2018-0025020
Apr. 24, 2018 (KR) .......... 10-2018-0047484

(51) Int. Cl.
*G06F 3/14* (2006.01)
*H04N 1/00* (2006.01)
*G09G 5/00* (2006.01)

(52) U.S. Cl.
CPC .......... *G06F 3/14* (2013.01); *G09G 5/00* (2013.01); *H04N 1/00129* (2013.01); *H04N 2201/3285* (2013.01)

(58) Field of Classification Search
CPC .......... G06F 3/14; H04N 1/00129; H04N 2201/3285; G09G 5/00; G09G 5/003; G09G 5/12
See application file for complete search history.

(56) References Cited

U.S. PATENT DOCUMENTS

| | | |
|---|---|---|
| 7,269,292 B2 | 9/2007 | Steinberg |
| 2009/0058990 A1 | 3/2009 | Kim et al. |

(Continued)

FOREIGN PATENT DOCUMENTS

| | | |
|---|---|---|
| EP | 2 570 986 A1 | 3/2013 |
| EP | 3 337 161 A1 | 6/2018 |

(Continued)

OTHER PUBLICATIONS

Chiori Hori et al., "Attention-Based Multimodal Fusion for Video Description", Mar. 9, 2017, Retrieved from the Internet: URL:https://arix.org/pdf/1701.03126.pdf, XP55511750. (8 pages total).

(Continued)

*Primary Examiner* — Casey L Kretzer
(74) *Attorney, Agent, or Firm* — Sughrue Mion, PLLC

(57) ABSTRACT

An electronic apparatus includes a communicator, an image capturer configured to acquire a capture image of a display apparatus including a screen, and a processor configured to identify a screen area of the screen, within the capture image. The processor is further configured to sample a plurality of patch images, each of which having a predetermined unit size, from a background area outside the screen area within the capture image, generate a screen image to be displayed on the screen, based on the plurality of patch (Continued)

images, and control the communicator to transmit the screen image to the display apparatus.

17 Claims, 22 Drawing Sheets

(56) References Cited

U.S. PATENT DOCUMENTS

| | | | |
|---|---|---|---|
| 2012/0013646 A1 | 1/2012 | Ichioka et al. | |
| 2013/0315445 A1* | 11/2013 | Schlieski | H04N 21/41407 382/103 |
| 2014/0307084 A1 | 10/2014 | Zontrop et al. | |
| 2014/0313117 A1 | 10/2014 | Addy et al. | |
| 2016/0140408 A1* | 5/2016 | Shen | G06K 9/4628 382/157 |
| 2017/0193322 A1* | 7/2017 | Schiller | A61B 5/72 |
| 2018/0350281 A1 | 12/2018 | Hur et al. | |

FOREIGN PATENT DOCUMENTS

| | | |
|---|---|---|
| JP | 2008-225372 A | 9/2008 |
| JP | 5136600 B2 | 2/2013 |
| JP | 2013-074395 A | 4/2013 |
| KR | 10-2006-0067343 A | 6/2006 |
| KR | 10-0621529 B1 | 9/2006 |
| KR | 10-2009-0041978 A | 4/2009 |
| KR | 10-2010-0010464 A | 2/2010 |
| KR | 10-2011-0033512 A | 3/2011 |
| KR | 10-2014-0085052 A | 7/2014 |
| KR | 10-2015-0054059 A | 5/2015 |
| KR | 10-1597576 B1 | 3/2016 |
| WO | 2017/078356 A1 | 5/2017 |

OTHER PUBLICATIONS

Joon Son Chung et al., "Lip Reading Sentences in the Wild", Nov. 16, 2016, Retrieved from the Internet: URL:https://arxiv.org/pdf/1611.05358v1.pdf, XP55511754. (12 pages total).

Dzmitry Bahdanau et al., "Neural Machine Translation by Jointly Learning to Align and Translate", May 19, 2016, Retrieved from the Internet: URL:https://arxiv.org/pdf/1409.0473.pdf, XP055399692. (15 pages total).

Search Report dated Oct. 11, 2018 by the European Patent Office in counterpart European Patent Application No. 18169500.8.

Photoxels. "Tutorial: Create A Transparent Screen Trick Photo", Aug. 8, 2010, pp. 1-18; https://www.photoxels.com/create-a-transparent-screen-trick-photo/ (18 pages total).

International Search and Written Opinion dated Feb. 15, 2019 by the International Searching Authority in counterpart international Patent Application No. PCT/KR2018/012656. (PCT/ISA/210 & PCT/ISA/237).

Office Action dated Apr. 15, 2019 by the Korean Intellectual Property Office in counterpart Korean Patent Application No. 10-2018-0047484.

Search Report dated Apr. 18, 2019 by the European Patent Office in counterpart European Patent Application No. 18204320.8.

Communication dated Nov. 3, 2020, issued by the State Intellectual Property Office of P.R. China in counterpart Chinese Application No. 201910004293.3.

* cited by examiner

FIG. 18
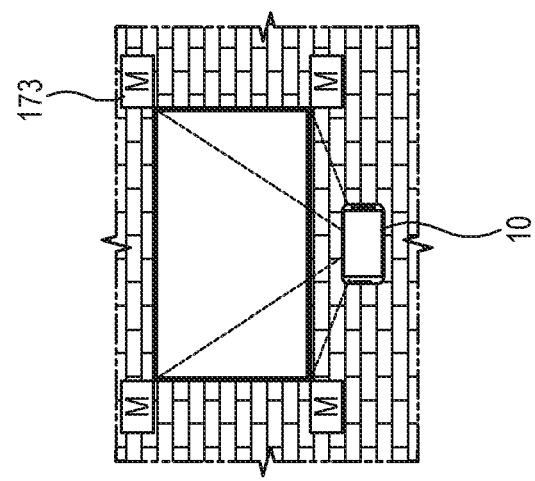
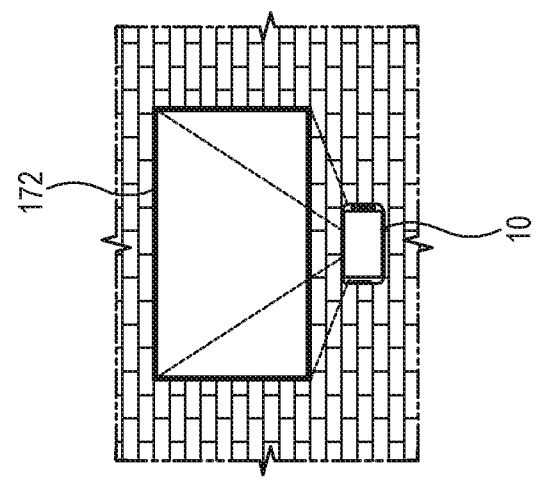
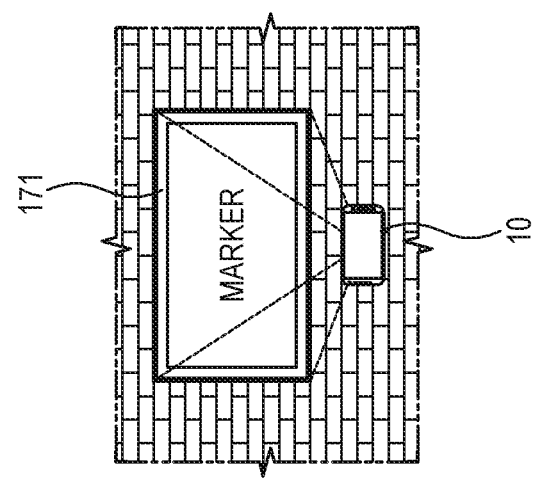

FIG. 21
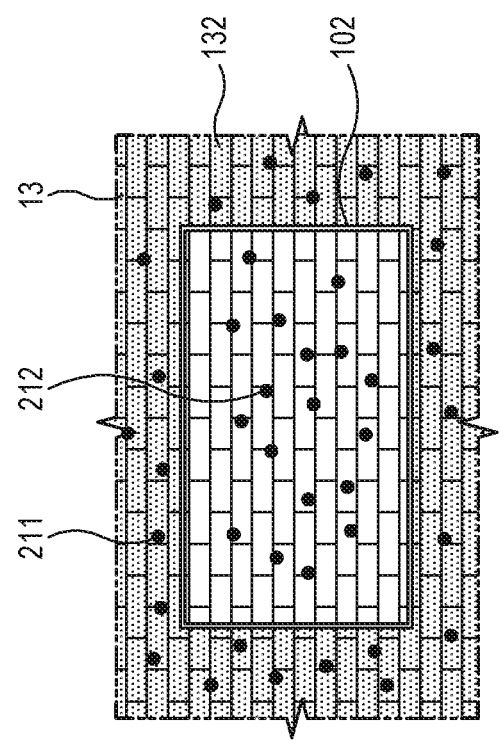
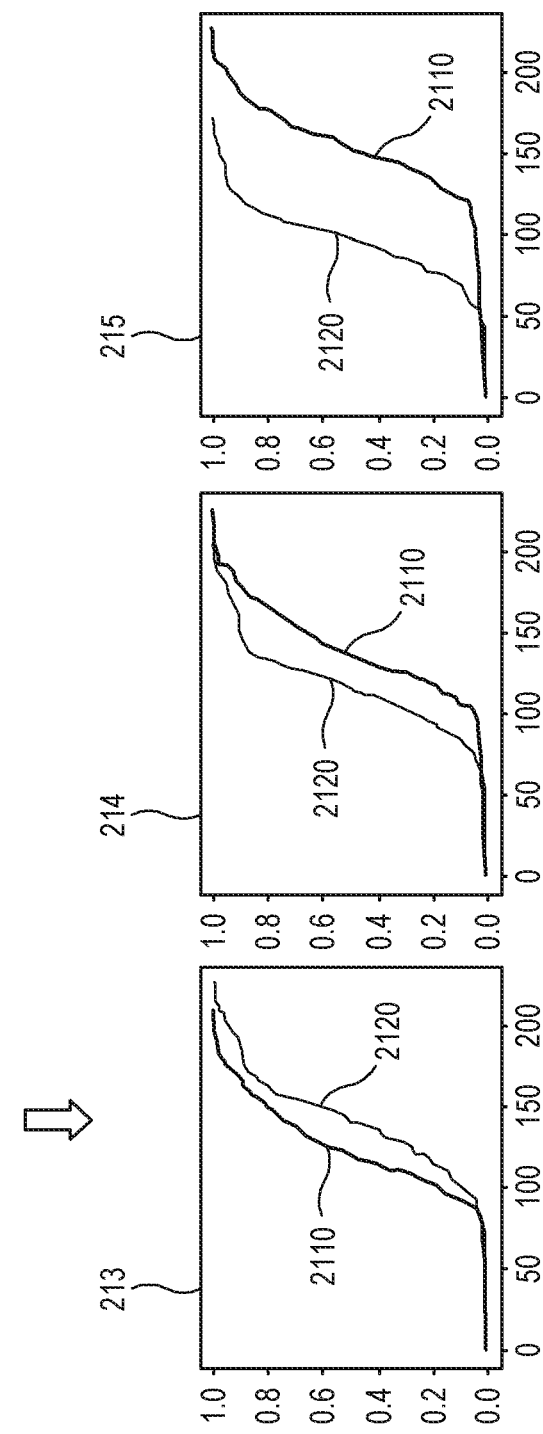

ELECTRONIC APPARATUS FOR GENERATING SCREEN IMAGE TO BE DISPLAYED BY DISPLAY APPARATUS AND CONTROL METHOD THEREOF

CROSS-REFERENCE TO RELATED APPLICATIONS

This application is based on and claims priorities under 35 U.S.C. § 119 to U.S. Provisional Patent Application No. 62/613,516 filed on Jan. 4, 2018, in the United States Patent and Trademark Office, and Korean Patent Application Nos. 10-2018-0025020 filed on Mar. 2, 2018, and 10-2018-0047484 filed on Apr. 24, 2018, in the Korean Intellectual Property Office, the disclosures of which are incorporated by reference herein in their entireties.

BACKGROUND

Field

Apparatuses and methods consistent with embodiments relate to an electronic apparatus and a control method thereof, and more particularly to an electronic apparatus for displaying an image similar to a surrounding background and a control method thereof.

Description of the Related Art

With recent development of display technology, a super-sized screen and image quality of high resolution have been provided in terms of displaying an image.

In addition, there have been attempts to provide a screen harmonized with a surrounding background instead of a monochrome screen while displaying no images.

Conventionally, an image to be displayed on a screen has been obtained by capturing an image of a wall before mounting a screen to the wall, or capturing or copying an image of the wall corresponding to half the size of a television (TV).

However, the conventional method needs much effort of a user, such as measuring a position of a screen on the wall before mounting the screen, capturing the wall corresponding to more than half the size of the screen, and so on.

Further, it is actually difficult for a user to obtain the image of the wall corresponding to more than half the size of the screen through a mobile apparatus.

Besides, when the image obtained by capturing the wall is directly applied to the screen, a user's additional control on the mobile apparatus is used to compensate for difference in brightness and saturation between the screen and the wall.

SUMMARY

According to embodiments, an electronic apparatus includes a communicator, an image capturer configured to acquire a capture image of a display apparatus including a screen, and a processor configured to identify a screen area of the screen, within the capture image. The processor is further configured to sample a plurality of patch images, each of which having a predetermined unit size, from a background area outside the screen area within the capture image, generate a screen image to be displayed on the screen, based on the plurality of patch images, and control the communicator to transmit the screen image to the display apparatus.

The processor may be further configured to compensate the screen image so that attributes of the screen image matches with attributes of an image of the background area.

The processor may be further configured to generate the screen image with one of the plurality of patch images, based on a similarity in pattern between the background area and the plurality of sampled patch images.

The processor may be further configured to identify a space between a plurality of same patterns that is repeated in the background area, and generate the screen image, based on the plurality of same patterns and the space.

The processor may be further configured to identify a first boundary line included in the background area, and generate the screen image so that a second boundary line included in the screen image is aligned with the first boundary line.

The processor may be further configured to calibrate a color of the screen image, based on a difference in RGB values between the screen area and the background area.

The electronic apparatus may further include a display, and the processor may be further configured to control the display to display a user interface (UI) for guiding a generation process of the screen image, while the screen image is being generated.

The electronic apparatus may further include a display, and the processor may be further configured to control the display to display a capture guide user interface (UI) for guiding a position at which the screen is aligned.

The processor may be further configured to control the display to a warning message, based on a position at which the screen is displayed being deviated from the capture guide UI.

According to example embodiments, a non-transitory computer-readable storage medium stores instructions configured to cause a processor to control to acquire a capture image of a display apparatus including a screen, identify a screen area of the screen, within the capture image, and sample a plurality of patch images, each of which having a predetermined unit size, from a background area outside the screen area within the capture image. The processor is further configured to execute the instructions to generate a screen image to be displayed on the screen, based on the plurality of patch images, and control to transmit the screen image to the display apparatus.

The instructions may be further configured to cause the processor to compensate the screen image so that attributes of the screen image matches with attributes of an image of the background area.

According to embodiments, a method of controlling an electronic apparatus, includes controlling to acquire a capture image of a display apparatus including a screen, identifying a screen area of the screen, within the capture image, and sampling a plurality of patch images, each of which having a predetermined unit size, from a background area outside of the screen area within the capture image. The method further includes generating a screen image to be displayed on the screen, based on the plurality of patch images, and controlling to transmit the screen image to the display apparatus.

The method may further include compensating the screen image so that attributes of the screen image match with attributes of an image of the background area.

The generating of the screen image may include generating the screen image with one of the plurality of patch images, based on a similarity in pattern between the background area and the plurality of sampled patch images.

The generating of the screen image may include identifying a space between a plurality of same patterns that is repeated in the background area, and generating the screen image, based on the plurality of same patterns and the space.

According to embodiments, an electronic apparatus includes a communicator, a display including a screen, and a processor configured to receive, via the communicator, a capture image of the display, from an external apparatus capable of acquiring the capture image. The processor is further configured to identify a screen area of the screen, within the capture image, sample a plurality of patch images, each of which having a predetermined unit size, from a background area outside of the screen area within the capture image, generate a screen image to be displayed on the screen, based on the plurality of sampled patch images, and control the display to display the screen image on the screen.

The processor may be further configured to compensate the screen image so that attributes of the screen image matches with attributes of an image of the background area.

The processor may be further configured to generate the screen image with one of the plurality of patch images, based on a similarity in pattern between the background area and the plurality of sampled patch images.

The processor may be further configured to control the display to display a guide user interface (UI) for distinguishing the screen area that is displayed on the display.

According to embodiments, a method of controlling an electronic apparatus, includes receiving a capture image of a display of the electronic apparatus, from an external apparatus capable of acquiring the capture image, identifying a screen area of a screen of the display, within the capture image, and sampling a plurality of patch images, each of which having a predetermined unit size, from a background area outside of the screen area within the capture image. The method further includes generating a screen image to be displayed on the screen, based on the plurality of sampled patch images, and controlling to display the screen image on the screen.

According to embodiments, an electronic apparatus includes a communicator, an image capturer configured to acquire a capture image of a display apparatus including a screen, and a processor configured to identify, within the capture image, a screen area of the screen and a background area outside the screen area. The processor is further configured to determine whether the background area is a color type or a pattern type, in response to the background area being determined to be the color type, generate a screen image to be displayed on the screen, the screen image being calibrated to have a color of the background area, in response to the background area being determined to be the pattern type, generate the screen image to have a pattern of the background area, and control the communicator to transmit the screen image to the display apparatus.

The processor may be further configured to in response to the background area being determined to be the pattern type, generate the screen image to have the pattern of the background area, and calibrate the screen image to have the color of the background area, and control the communicator to transmit the screen image that is calibrated, to the display apparatus.

BRIEF DESCRIPTION OF THE DRAWINGS

The above and/or other aspects will become apparent and more readily appreciated from the following description of embodiments, taken in conjunction with the accompanying drawings, in which:

FIG. 18 illustrates an example of a method of recognizing a TV screen according to an embodiment;

FIG. 21 and FIG. 22 illustrate an example of using cumulative histogram matching for color calibration of a screen image according to an embodiment.

DETAILED DESCRIPTION OF EMBODIMENTS

Hereinafter, embodiments will be described in detail with reference to accompanying drawings to be easily realized by a person having ordinary skill in the art. The disclosure may be materialized in various different forms and not limited to the embodiments set forth herein.

Figure 1:
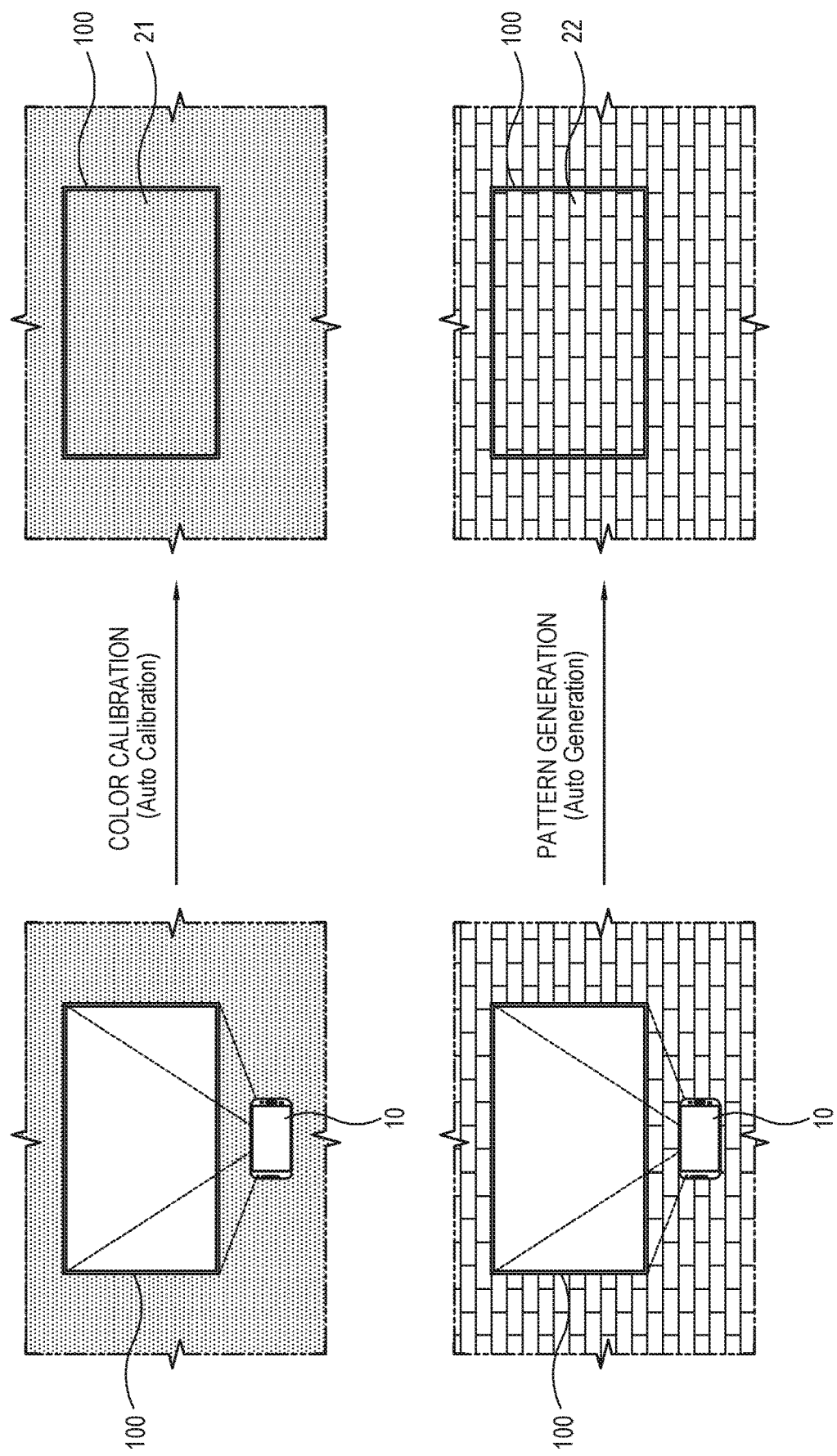
FIG. 1 illustrates a fundamental concept of providing a screen image similar to a surrounding background of a TV screen by a mobile apparatus according to an embodiment.

FIG. 1 illustrates a fundamental concept of providing a screen image similar to a surrounding background of a TV screen by a mobile apparatus according to an embodiment. As shown in FIG. 1, a mobile apparatus 10 captures images of a screen of a TV 100 and a wall around the screen in front, and identifies the wall around the screen of the TV 100 from the capture image, thereby generating an image similar to the wall.

In this process, when the identified wall has only color, the mobile apparatus 10 uses color calibration to generate an image 21 having the same color as the wall and outputs the generated image to the screen of the TV 100.

Further, when the identified wall has a predetermined pattern, for example, a brick, a tree, etc., the mobile apparatus 10 uses pattern generation to generate an image 22 having the same pattern as the wall and outputs the generated image to the screen of the TV 100.

Figure 2:
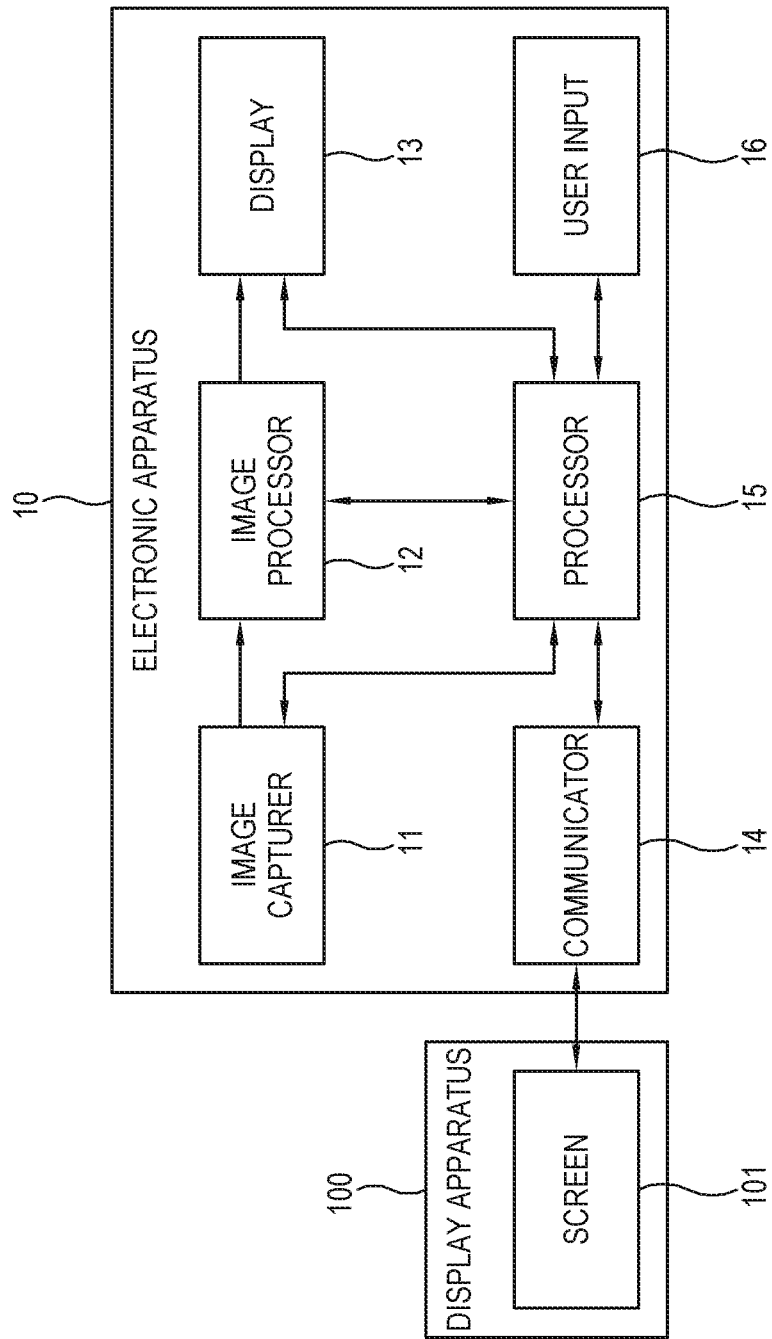
FIG. 2 is a block diagram of an electronic apparatus according to an embodiment.

FIG. 2 is a block diagram of an electronic apparatus according to an embodiment. As shown in FIG. 2, an electronic apparatus 10 (i.e., the mobile apparatus 10) includes an image capturer 11 (e.g., a camera), an image processor 12, a display 13, a communicator 14 (i.e., a communication interface), a processor 15 and a user input 16 (i.e., a user input interface), and may further include a storage. The electronic apparatus 10 is for example materialized by a mobile apparatus such as a smart phone, a tablet computer, a notebook computer, or the like capable of capturing an image. The electronic apparatus 10 may communicate with a display apparatus 100 (i.e., the TV 100) through the communicator 14. The display apparatus 100 is for example materialized by a TV, a large format display (LFD), a monitor, etc., and includes a screen 101. The elements included in the electronic apparatus 10 are not limited to those according to an embodiment, but may exclude some elements or additionally include other elements.

The image capturer 11 takes an image of the front thereof to obtain a capture image. The image capturer 11 is for example materialized by a camera having a complementary metal oxide semiconductor (CMOS), a charge coupled device (CCD), or the like image sensor.

The image processor 12 performs a preset image processing process with regard to a capture image obtained by an image capturer 11 or an image signal received from an external apparatus. As an example of the image processing process performed in the image processor 12, there are demultiplexing, decoding, de-interlacing, scaling, noise reduction, detail enhancement, and there are no limits to the kind of image processing processes. The image processor 12 may be achieved by a system-on-chip (SoC) in which such processing functions are integrated, or an image processing board on which individual components for independently performing the processes are mounted.

The display 13 displays a capture image processed by the image processor 12, or an image based on an image signal. The display 13 may be variously materialized by a plasma display panel (PDP), a liquid crystal display (LCD), an organic light emitting diode (OLED), a flexible display, etc. without limitations.

The communicator 14 communicates with the display apparatus 100 by a wired or wireless communication method. The communicator 13 may for example use Wi-Fi direct, Bluetooth, Zigbee, or the like near field communication method to communicate with the display apparatus 100. When the communicator 14 uses Bluetooth to communicate with the display apparatus 100, the connection may be achieved by pairing with the display apparatus 100.

The user input 16 receives a user input for controlling at least one function of the electronic apparatus 10. For example, the user input 16 may receive a user input for selecting a part of a user interface (UI) displayed on the display 13. The user input 16 may be provided as an input panel provided on an outer side of the electronic apparatus 10 or as a touch screen provided in the electronic apparatus 10. Further, the user input 16 may be materialized as a keyboard, a mouse, etc. connected to the electronic apparatus 10, and may be materialized by a remote controller that uses infrared to communicate with the electronic apparatus 10.

According to one embodiment, the user input 16 may receive a user input from the mobile apparatus that communicates with the electronic apparatus 10 through the Wi-Fi, Bluetooth or infrared communication method. In this case, the mobile apparatus may be materialized by a smart phone or the like. For example, a remote controller application is installed and executed in the smart phone, and a button for controlling an operation of the electronic apparatus 10 is touched, thereby transmitting a user input to the electronic apparatus 10.

The storage includes a first memory and a second memory, in which the first memory is materialized by a nonvolatile memory such as a flash memory that retains data regardless of whether the electronic apparatus 10 is powered on or off.

The first memory is configured to store a plurality of instructions for executing at least one application. The plurality of instructions stored in the first memory may be each subjected to reading, writing, editing, deleting, updating, etc.

The second memory refers to a high-speed buffer memory provided between the first memory and the processor 15, and is called a cache memory or a local memory. The second memory has higher speed than the flash memory, and is directly accessible by the processor 15. The second memory refers to an area, in which data or a program instruction that will be frequently accessed by the processor 15 is stored to be instantly usable without repetitive searches, and may for example materialized by a random access memory (RAM). According to one embodiment, the second memory may be for example integrally provided into the processor 15.

The processor 15 performs a control process for controlling a plurality of functions to be implemented in the electronic apparatus 10. The processor 15 may be materialized by a central processing unit (CPU), and includes three regions of control, operation and register. The control region analyzes a program instruction, and instructs the elements of the electronic apparatus 10 to operate in accordance with the meaning of the analyzed instruction. The operation region implements an arithmetic operation and a logic operation, and performs the operation for operating the elements of the electronic apparatus 10 in response to the instruction of the control region. The register region is a memory place for storing pieces of information used while the CPU executes the instruction, and stores instructions and data for each element of the electronic apparatus 10 and the results of the operations.

The processor 15 executes at least one program, and may for example execute the electronic apparatus 10.

Figure 3:
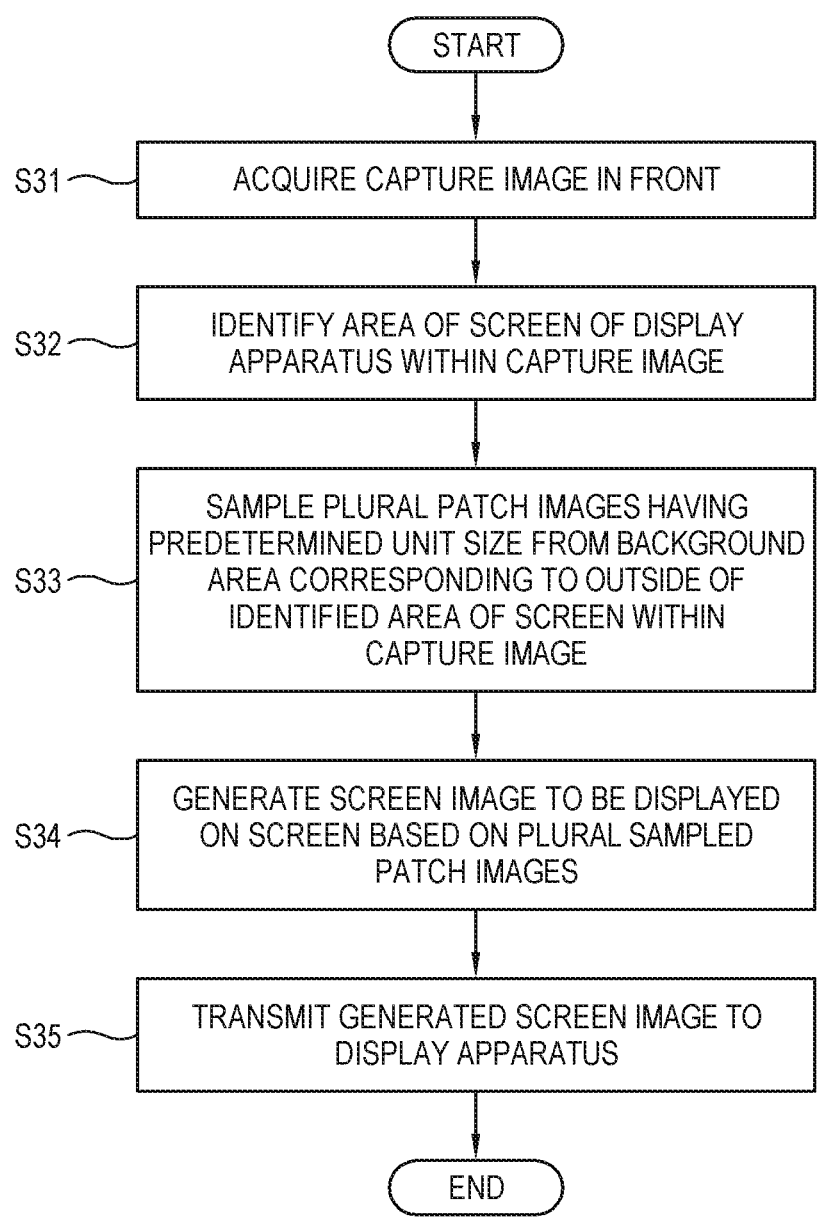
FIG. 3 is a flowchart of showing a control method of an electronic apparatus according to an embodiment.
Figure 4:
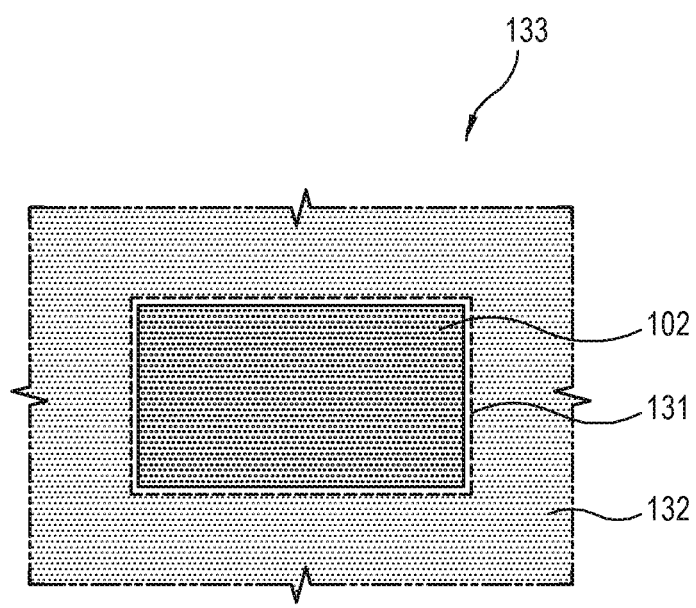
FIG. 4 illustrates an example of showing a screen area and a background image in a capture image according to an embodiment.

FIG. 3 is a flowchart of showing a control method of an electronic apparatus according to an embodiment, and FIG. 4 illustrates an example of showing a screen area and a background image in a capture image according to an embodiment. According to an embodiment, the operations of the processor 15 are as shown in the flowchart of FIG. 3. First, at operation S31, the processor 15 acquires a front capture image (see '133' in FIG. 4). In this case, the processor 15 may display a capture guide UI (see '131' in FIG. 4) for guiding a position at which the screen 101 of the display apparatus 100 is aligned with the display 13 when the capture image 133 is acquired. Thus, a user can directly move the electronic apparatus 10 so that the screen 101 is positioned within the capture guide UI 131.

Further, the capture guide UI 131 guides a user to capture an image including the screen 101 and a minimum background around the screen 101.

According to one embodiment, the processor 15 may make a warning message be displayed on the display 13 when a position at which the screen 101 is displayed is deviated from the capture guide UI 131.

Next, at operation S32, the processor 15 identifies an area (see '102' in FIG. 4) of a screen within the capture image 133. In this case, the display apparatus 100 may for example display a guide UI (see '171' in FIG. 18 and '181' in FIG. 19) such as a marker having various shapes and colors on a boundary part of the screen 101 so that the processor 15 can identify the area 102 of the screen.

At operation S33, the processor 15 samples a plurality of patch images (see '91' and '92' in FIG. 9) having a predetermined unit size from a background area (see '132' in FIG. 4) surrounding the identified area 102 of the screen within the capture image 133. Next, at operation S34, the processor 15 generates a screen image to be displayed on the screen 101 on the basis of a plurality of sampled patch images 91, 92, . . . .

According to one embodiment, the operation S34 may include an operation of generating the screen image with the patch images 91, 92, . . . selected among the plurality of patch images 91, 92, . . . based on similarity between the background area 132 and the plurality of patch images 91, 92, . . . sampled in the operation S33.

According to one embodiment, the operation S34 may include operations of identifying a space between the plurality of same patterns repeated in the background area 132, and generating the screen image based on the pattern and the space.

According to one embodiment, the operation S34 may include operations of identifying a first boundary line (see '121' and '122' in FIG. 12) involved in the background area 132, and generating the screen image so that a second boundary line (see '123' in FIG. 12) to be involved in the screen image can be aligned with the first boundary lines 121 and 122.

According to one embodiment, the operation S34 may further include an operation of calibrating the colors of the screen image based on difference in RGB values between the background area 132 and the area 102 of the screen.

According to one embodiment, at operation S34 may further include an operation of displaying a UI (see '105' in FIG. 10) for guiding a process of generating the screen image while generating the screen image.

Last, at operation S35, the generated screen image is transmitted to the display apparatus 100.

As described above, only the minimum background image around the screen is used to provide a screen similar to the surrounding background, and thus the screen is expected to have an invisible effect. Further, a user's control is minimized in terms of providing the screen similar to the surrounding background.

The electronic apparatus 10 may perform an operation of generating a screen image based on the image of the background area, by downloading and executing an instruction stored in a separate computer program product. For example, the electronic apparatus 10 downloads and installs a predetermined application program, which provides a function of generating a screen image similar to the surrounding background of the screen 101, from an external server, and executes the installed application program, thereby generating a screen image to be displayed on the screen 101 of the display apparatus 100.

According to one embodiment, the computer program product includes a memory in which a plurality of instructions is stored, and a processor. When executed by the processor, the instruction may be given to identify an area for the screen within the capture image acquired by the image capturer, sample a plurality of patch images having a predetermined unit size from a background area corresponding to the outside of the identified area for the screen within the capture image, generate the screen image to be displayed on the screen 101 based on the plurality of sampled patch images, and transmit the generated screen image to the display apparatus 100.

According to one embodiment, the instruction may be given to compensate for the screen image so that the attributes of the screen image can correspond to the attributes of the image on the background area.

Figure 5:
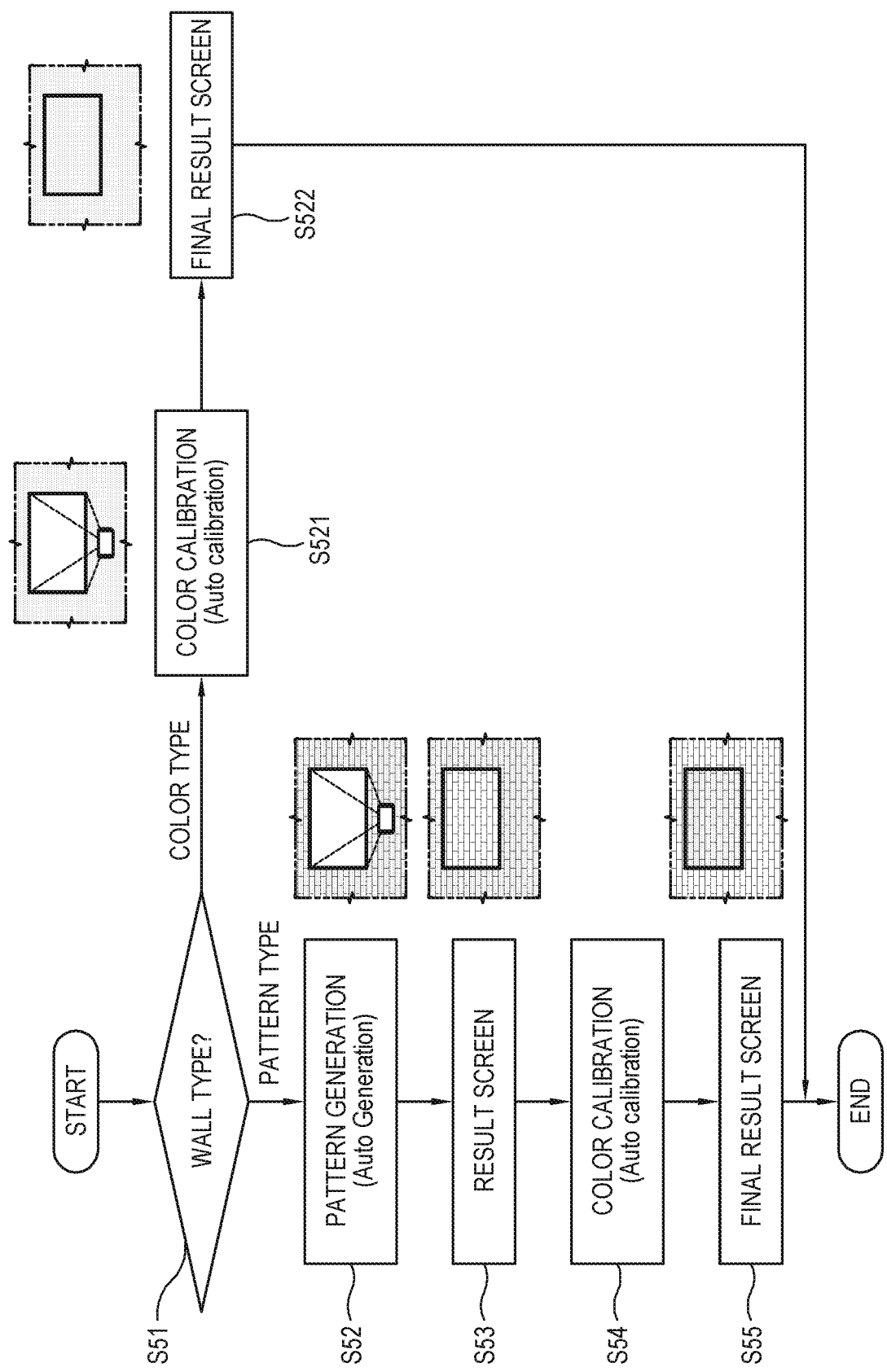
FIG. 5 is a flowchart of generating a screen image in accordance with types of a wall according to an embodiment.

FIG. 5 is a flowchart of generating a screen image in accordance with types of a wall according to an embodiment. The flowchart shows detailed operations based on the types of the wall corresponding to the background area 132 in the operation S34 of FIG. 3, when the processor 15 performs the operation of generating the screen image to be displayed on the screen 101 based on the image of the background area 132.

As shown in FIG. 5, first, at operation S51, the processor 15 identifies the type of the wall around the screen from the image of the background area 132. When the wall is of a color type as a result of the identification, the processor 15 performs color calibration at operation S521, and outputs a screen image, i.e., a final result screen showing the same color as the wall around the screen at operation S522. Here, the color calibration may for example include compensation for color, brightness, saturation, white balance, etc.

As a result of the operation S51, when the wall is of a pattern type, the processor 15 performs pattern generation at operation S52, and outputs a result screen showing the same pattern as the wall around the screen at operation S53.

Next, at operation S54, the processor 15 additionally performs color calibration with regard to the result screen output in the operation S53. Last, at operation S55, the processor 15 outputs a screen image, i.e., a final result screen showing the same pattern and color as the wall around the screen.

Figure 6:
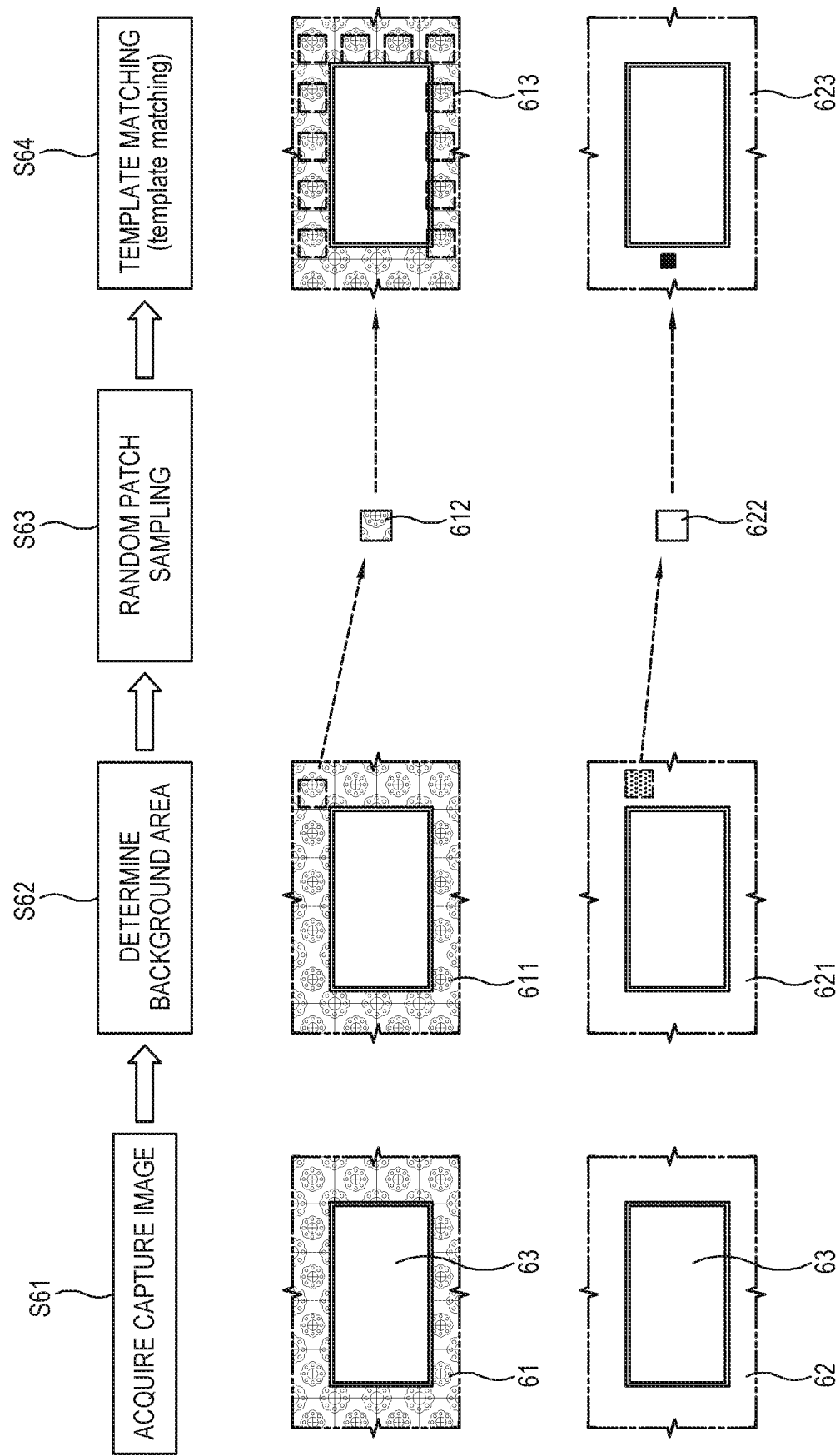
FIG. 6 illustrates an example of an algorithm for identifying a type of a wall from a capture image according to an embodiment.

FIG. 6 illustrates an example of an algorithm for identifying a type of a wall from a capture image according to an embodiment. The illustrated example shows a detailed method of identifying the type of the wall around the screen from the image of the background area 132 in the operation S51 of FIG. 5.

As shown in FIG. 6, first, at operation S61, the processor 15 acquires a capture image 61 or 62 of the screen 101 and the wall around the screen 101. Next, at operation S62, the processor 15 identifies a background area 611 or 621 corresponding to an outside area surrounding a screen area 63 from the capture image 61 or 62.

Next, at operation S63, the processor 15 randomly samples a patch 612 or 622 having a predetermined size from the identified background area 611 or 621.

Last, at operation S64, the processor 15 uses the sampled patch 612 or 622 to perform template matching with regard to the entire background area 611 or 621. Here, as a result of the template matching, when the matched patches are positioned leaving a space (613), it is identified that the wall is of the pattern type. On the other hand, when the matched patches are not positioned leaving a space, it is identified that the wall is of the color type.

Figure 7:
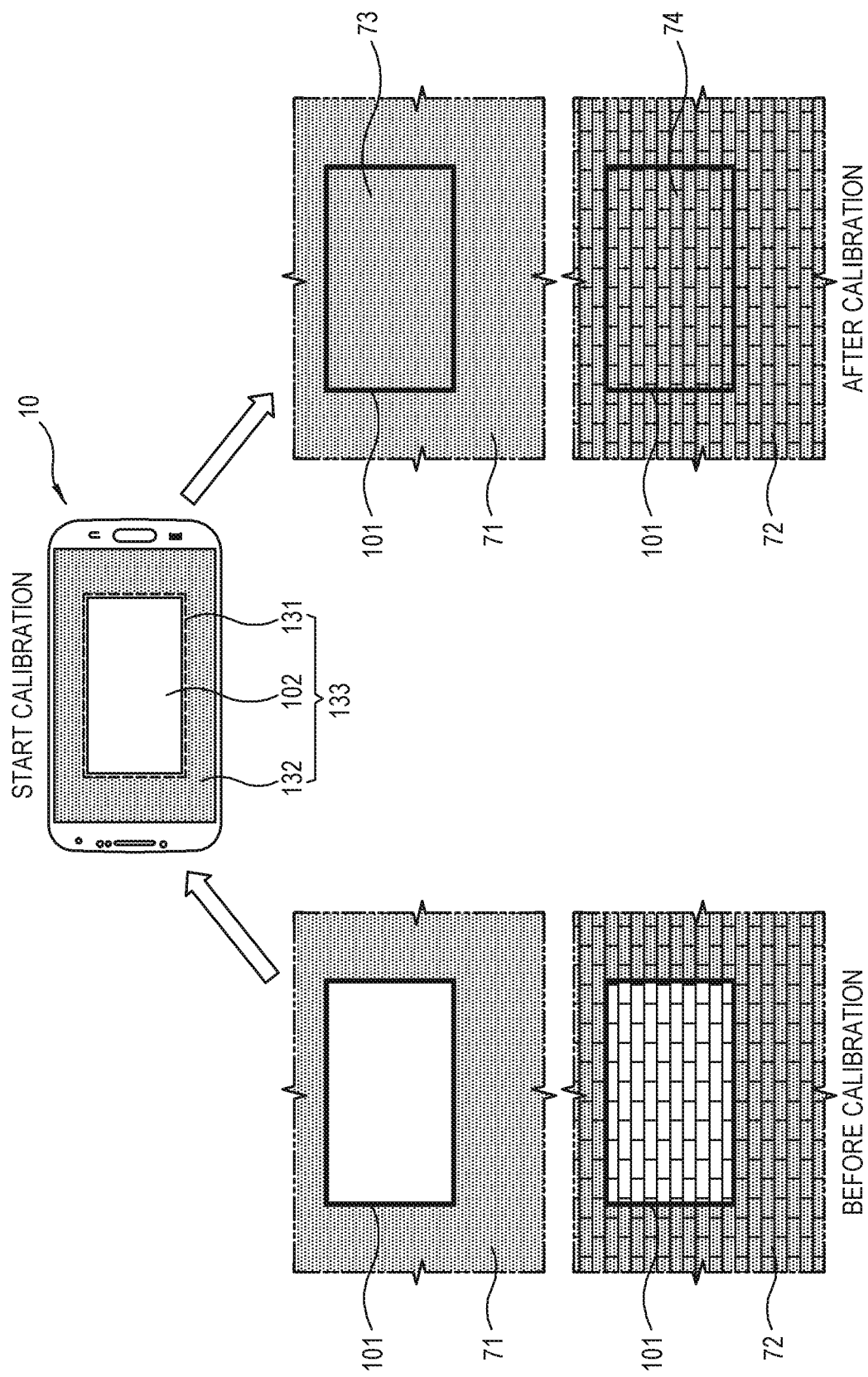
FIG. 7 illustrates an example of applying color calibration when generating a screen image similar to a wall according to an embodiment.

FIG. 7 illustrates an example of applying color calibration when generating a screen image similar to a wall according to an embodiment. The illustrated example shows a detailed operation of performing the color calibration in the operation S521 of FIG. 5 when it is identified in the operation S51 that the wall is of the color type.

As shown in FIG. 7, in the mobile apparatus 10, when an 'invisible screen mode' is selected in response to a user input, the processor 15 first acquires a capture image 133 of a screen 101 of a TV in front of the mobile apparatus 10 and a wall 71 or 72 around the screen 101.

In this case, the processor 15 may guide a user to arrange the screen 101 of the TV through the capture guide UI 131 displayed at a center region of the display 13. According to one embodiment, the processor 15 may provide an additional guide to a user through an audio output or the like besides the capture guide UI 131.

Further, for example, when a user selects a function of 'screen image generation' by a button input or the like after arranging the screen 101, the processor 15 generates a screen image 73 or 74 having color, brightness, saturation, white balance and the like similar to those of the wall around the screen by a preset color calibration algorithm, and provides the screen image 73 or 74 to the display apparatus 100.

The processor 15 operates based on the color calibration algorithm as follows.

1) n pixels are sampled from each of the area 102 of the screen corresponding to the screen 101, and the background area 132 corresponding to the wall 71 or 72.

2) RGB values of the sampled pixels of the area 102 of the screen and the pixels of the background area 132 are obtained at predetermined time intervals, and each RGB average value of them is obtained.

AvgS=Average(ScreenPick[n])

AvgW=Average(WallPick[n])

3) A difference in RGB value between the area 102 of the screen and the background area 132 is obtained.

Diff=AvgS−AvgW

4) The difference in the RGV value is added to the RGB value of the pixels in the area 102 of the screen.

ScreenPick[n]+Diff=Edited Screen

5) The RGB value (Edited Screen) summed in 4) is normalized between '0' and '1' to thereby obtain a correction layer.

6) The RGB value (Edited Screen) summed in 4) is multiplied by the correction layer obtained in 5) to generate a final calibration result.

Edited Screen*Correction Layer=Final Result

Figure 8:
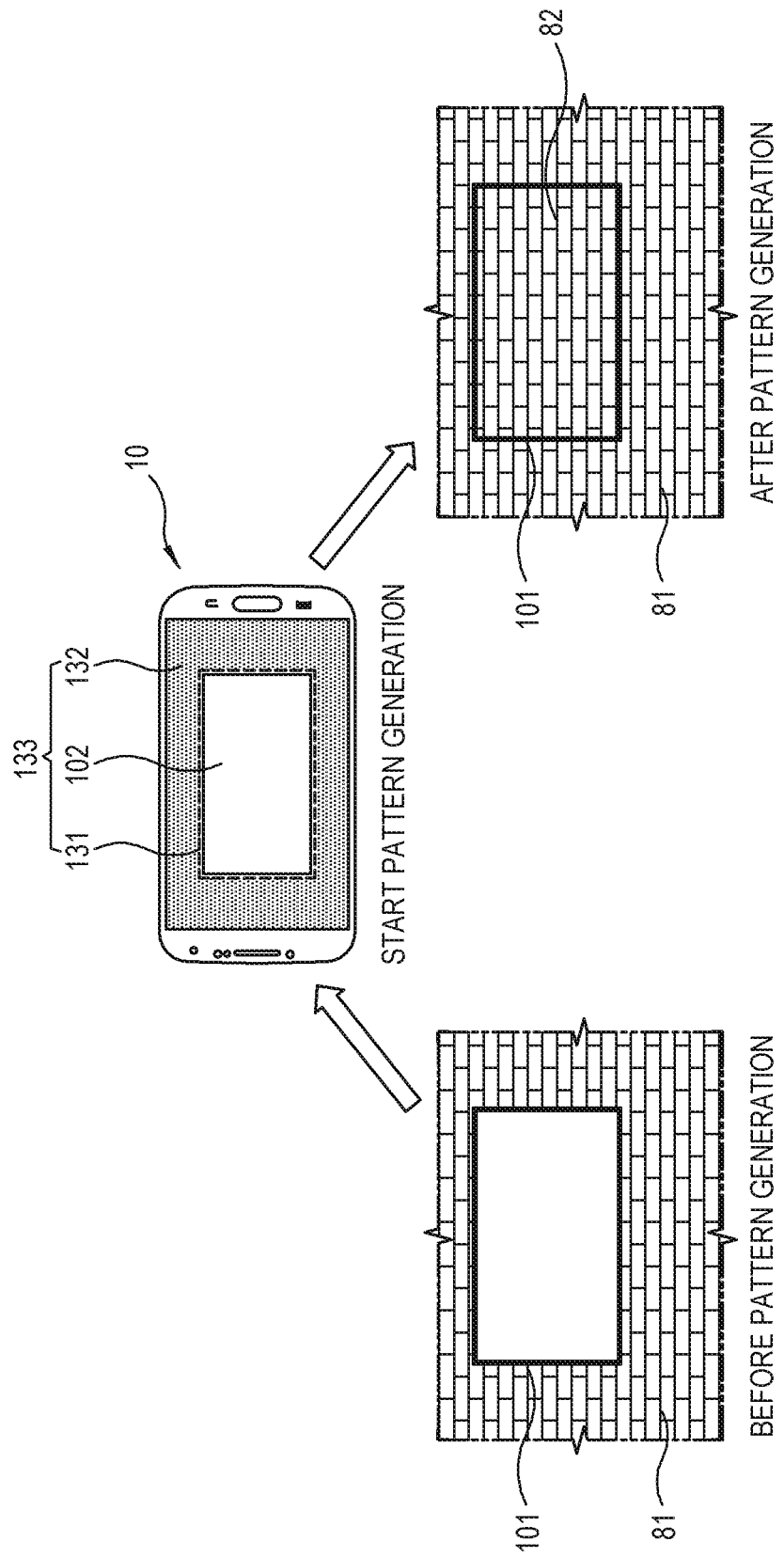
FIG. 8 illustrates an example of applying pattern generation when generating a screen image similar to a wall according to an embodiment.

By the foregoing color calibration algorithm, an image having color similar to the wall around the screen is output to the screen, and it is thus expected to have an aesthetic effect on making the wall and the screen not be recognized with color FIG. 8 illustrates an example of applying pattern generation when generating a screen image similar to a wall according to an embodiment. The illustrated example shows a detailed operation of generating a pattern in the operation S52 of FIG. 5 when it is identified in the operation S51 that the wall is of the pattern type.

As shown in FIG. 8, in the mobile apparatus 10, when the 'invisible screen mode' is selected in response to a user input, the processor 15 acquires a capture image 133 of a screen 101 of a TV in front of the mobile apparatus 10 and a wall 81 around the screen 101.

In this case, the processor 15 may guide a user to arrange the screen 101 of the TV through the capture guide UI 131 displayed at a center region of the display 13.

Further, for example, when a user selects a function of 'screen image generation' by a button input or the like after arranging the screen 101, the processor 15 generates a screen image 82 having a pattern similar to that of the wall around the screen 101 by a preset pattern generation algorithm.

The operations of the processor 15 based on the pattern generation algorithm will be described with reference to FIGS. 9 to 12.

Figure 9:
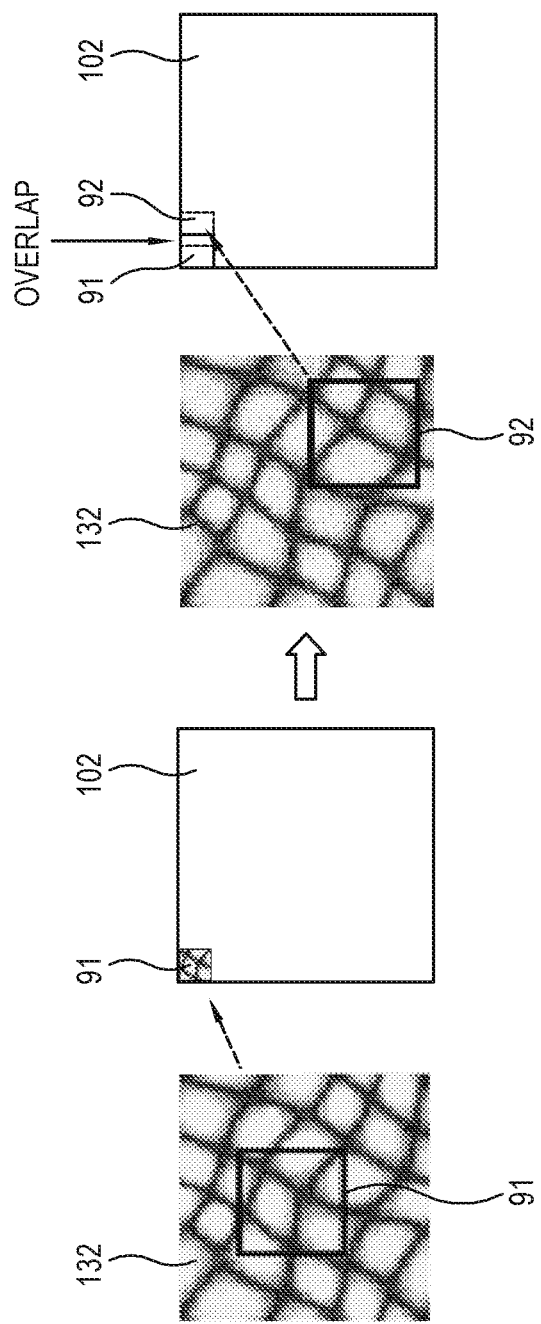
FIG. 9 illustrates an example of generating a screen image based on similarity between a patch sampled from a background area and a pattern of the background area according to an embodiment.

FIG. 9 illustrates an example of generating a screen image based on similarity between a patch sampled from a background area and a pattern of the background area according to an embodiment. The illustrated example shows one embodiment of a method of generating a pattern in the operation S52 of FIG. 5.

As shown in FIG. 9, to generate a pattern similar to the wall around the screen 101, a texture synthesis method of using similarity between patterns may be used.

According to one embodiment, the processor 15 randomly samples a plurality of patch images 91, 92, . . . from the background area 132 where the wall around the screen 101 is displayed within the capture image 133. For example, the processor 15 may samples about 1,000 patch images 91, 92, . . . corresponding to a predetermined size from the background area 132. In this case, the number of patch images 91, 92, . . . to be sampled may be set without limitations by taking the size of data to be processed by the processor 15, data processing time, etc. into account.

Next, the processor 15 generates a pattern in such a manner of arranging the plurality of sampled patch images 91, 92, . . . from a left top of the area 102 of the screen. In this case, the plurality of images 91, 92, . . . are arranged to include the area 102 of the screen and a part of the background area 132.

In this process, a pattern image, which is adjacent to a position to be arranged in the area 102 of the screen and has high similarity to the pattern of the background area 132, is selected among the plurality of images 91, 92, . . . and arranged in the area 102 of the screen. In this case, the patch image to be arranged is selected considering not only the adjacent background area 132 but also similarity to the pattern of the patch image previously arranged in the area 102 of the screen.

For example, a patch image A 91 is arranged at the left top in the area 102 of the screen, and then a patch image B 92 having high similarity to the pattern of the patch image A 91 is selected and arranged overlapping with the patch image A 91.

By the foregoing pattern generation method, the screen image is generated to have a pattern similar to the wall around the screen 101.

Figure 10:
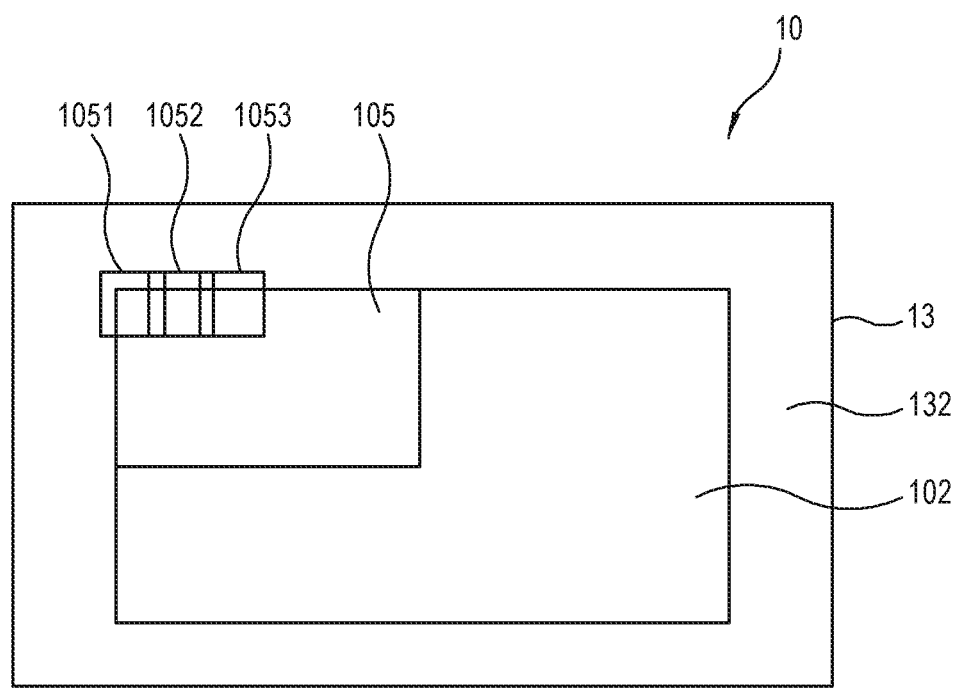
FIG. 10 illustrates a UI for guiding a process of generating a screen image according to an embodiment.

FIG. 10 illustrates a UI for guiding a process of generating a screen image according to an embodiment. The illustrated example shows an example of additional operations when a screen image is generated by the pattern generation method of FIG. 9.

As shown in FIG. 10, for example, in the electronic apparatus 10 materialized by the mobile apparatus, the processor 15 may display a UI for guiding a generation process of the screen image on the display 13 while a screen image is generated by the pattern generation method described with reference to FIG. 9.

According to one embodiment, the processor 15 may generate a screen image in such a manner that a plurality of patch images 1051, 1052, 1053, . . . randomly sampled from the background area 132 are arranged from the left top of in the area 102 of the screen.

In this case, it takes more than a predetermined period of time to generate the screen image, and a user has to wait until the screen image is displayed on the display 13.

While a user waits until displaying the screen image, the processor 15 may process a UI 105 to be displayed so that the user can directly view the generation of the screen image.

According to one embodiment, the processor 15 may process the UI 105 to be displayed showing that the plurality of patch images 1051, 1052, 1053, . . . are arranged in sequence from the left top in the area 102 of the screen.

According to one embodiment, the processor 15 may process the UI 105, which guides the generation of the screen image, to be displayed to be smaller than the area 102 of the screen in the form of a picture in picture (PIP).

Figure 11:
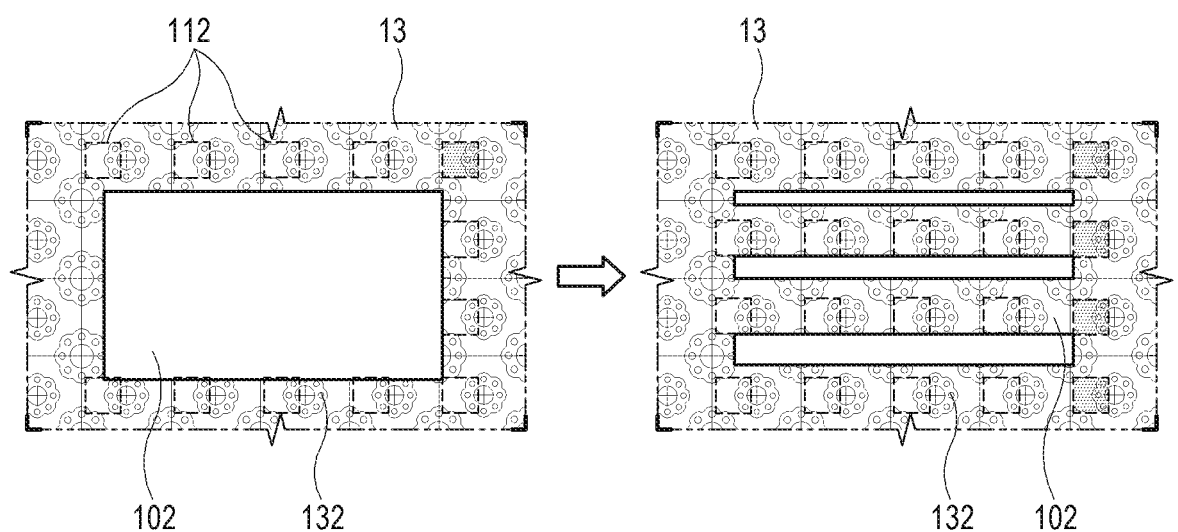
FIG. 11 illustrates an example of generating a screen image by identifying a repeating pattern and a space from a background image according to an embodiment.

FIG. 11 illustrates an example of generating a screen image by identifying a repeating pattern and a space from a background image according to an embodiment. The illustrated example shows one embodiment of the pattern generation method in the operation S52 of FIG. 5.

As shown in FIG. 11, to generate a pattern similar to the wall around the screen 101, the processor 15 may identify a space between a plurality of same repeating patterns 112 from the background area 132 within the capture image 133, and generate the screen image based on the pattern 112 and the space.

According to one embodiment, the processor 15 identifies the plurality of same repeating patterns 112 having a predetermined size from the background area 132, and obtains the spaces between the plurality of identified patterns 112 in X and Y axial directions. In this case, the processor 15 may use the spaces between the plurality of identified patterns 112 in the X and Y axial directions to arrange the plurality of patterns 112 at regular intervals within the area 102 of the screen.

Further, the processor 15 generates a pattern through a texture synthesis method described in FIG. 9, with regard to an empty area after the plurality of patterns 112 is arranged within the area 102 of the screen.

Figure 12:
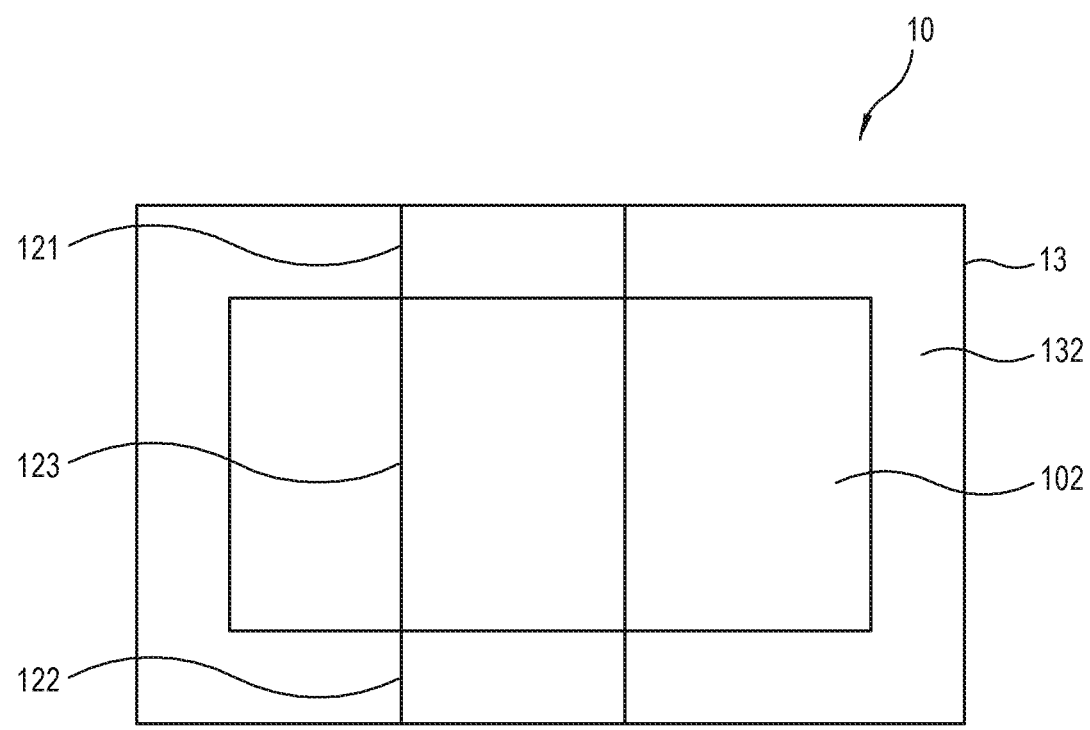
FIG. 12 illustrates an example of generating a screen image to be aligned with a boundary line included in a background image according to an embodiment.

FIG. 12 illustrates an example of generating a screen image to be aligned with a boundary line included in a background image according to an embodiment. The illustrated example shows one embodiment of the pattern generation method in the operation S52 of FIG. 5.

As shown in FIG. 12, for example, in the electronic apparatus 10 materialized by the mobile apparatus, the processor 15 identifies the first boundary lines 121 and 122 involved in the background area 132, and makes a screen image include the second boundary line 123 to be aligned with the first boundary lines 121 and 122 when generating the screen image.

According to one embodiment, when the first boundary lines 121 and 122 are present in the background area 132 where the wall is displayed, the processor 15 generates the second boundary line 123 leading to the first boundary lines 121 and 122 within the area 102 of the screen, and generates a pattern by the texture synthesis method described in FIG. 9 with regard to the other areas.

Figure 13:
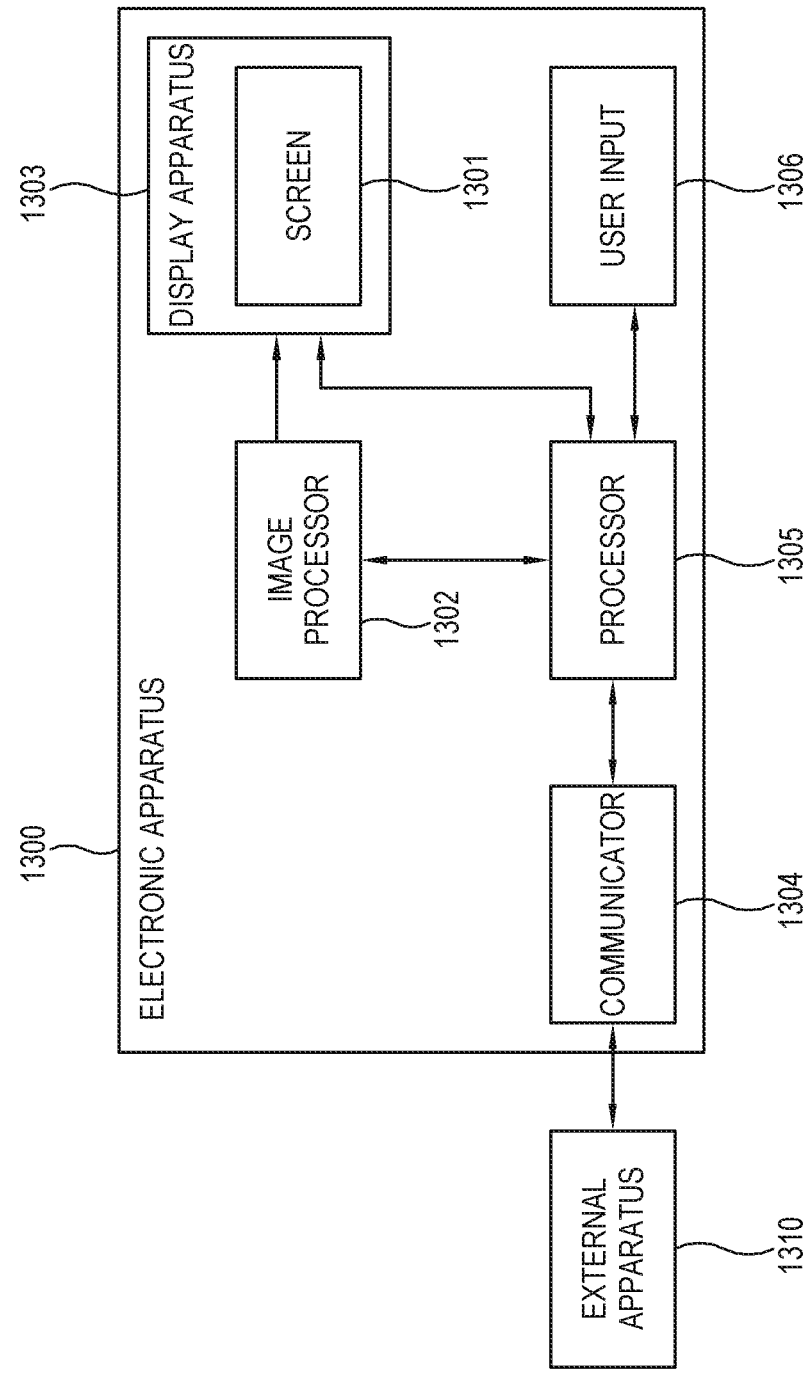
FIG. 13 is a block diagram of an electronic apparatus according to another embodiment.

FIG. 13 is a block diagram of an electronic apparatus according to another embodiment. As shown in FIG. 13, an electronic apparatus 1300 of this embodiment includes an image processor 1302, a display apparatus 1303, a communicator 1304, a processor 1305 and a user input 1306, and the display apparatus 1303 includes a screen 1301. The electronic apparatus 1300 may further include a storage. The electronic apparatus 1300 is for example be materialized by a TV, a large format display (LFD), a monitor, etc. The electronic apparatus 1300 may communicate with an external apparatus 1310 through the communicator 1304. The external apparatus 1310 is for example materialized by a smart phone, a tablet computer, a notebook computer, or the like mobile apparatus capable of capturing an image.

In the illustrated elements, the electronic apparatus 1300 and the external apparatus 1310 correspond to the display apparatus 100 and the electronic apparatus 10 of FIG. 2, respectively. The electronic apparatus 10 of FIG. 2, for example, the mobile apparatus generates the screen image having a similar pattern to the wall around the screen 101 of the display apparatus 100 and provides the generated screen image to the display apparatus 100. On the other hand, the electronic apparatus 1300 of FIG. 13, for example, the TV directly generates a screen image having a similar pattern to the wall around the screen 1301, and displays the generated screen image on the screen 1301.

The functions of the image processor 1302, the display apparatus 1303, the communicator 1304, and the user input 1306 among the elements of the electronic apparatus 1300 are respectively similar to those of the image processor 12, the display 13, the communicator 14, and the user input 16 among the elements of the electronic apparatus 100 of FIG. 2, and therefore repetitive descriptions will be avoided. Below, operations of only the processor 1305 having difference will be described.

Figure 14:
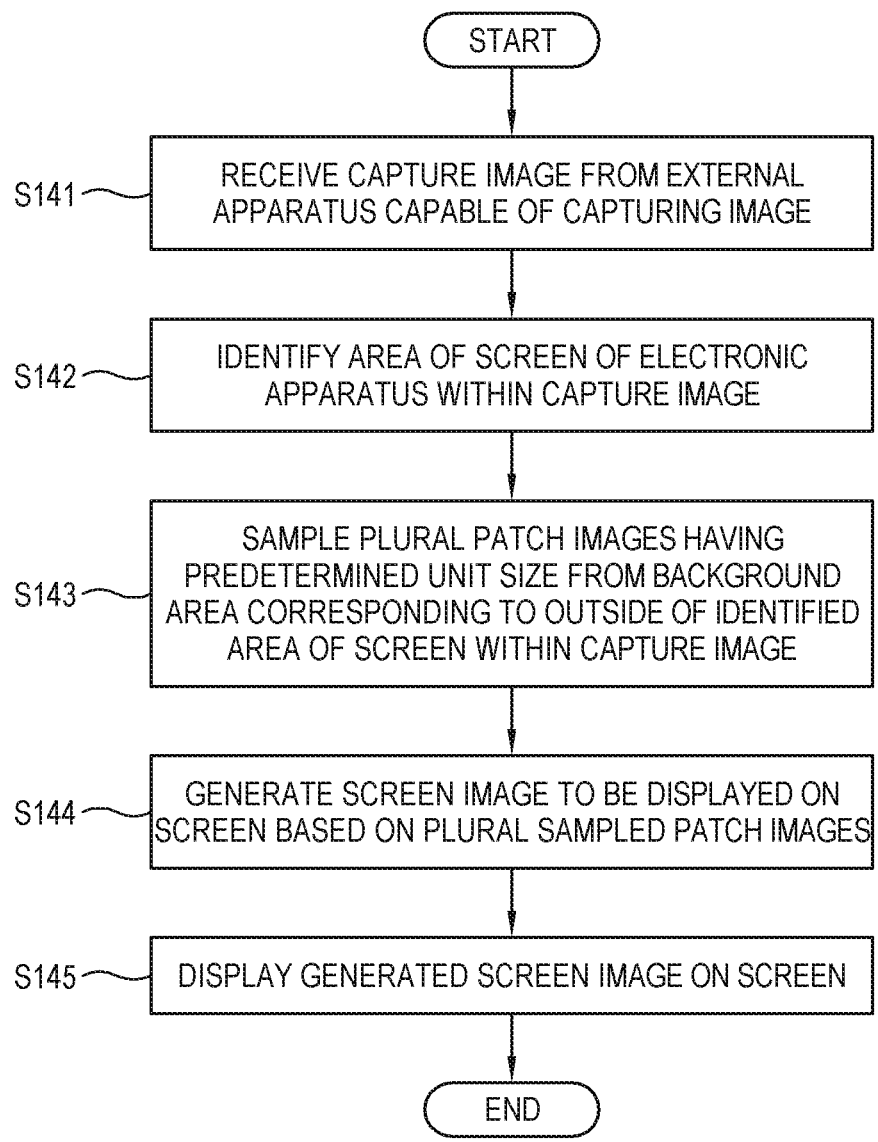
FIG. 14 is a flowchart of showing a control method of an electronic apparatus according to an embodiment.

FIG. 14 is a flowchart of showing a control method of an electronic apparatus according to an embodiment. According to this embodiment, the operations of the processor 1305 may be illustrated as a flowchart shown in FIG. 14. First, at operation S141, the processor 1305 receives a capture image 133 from the external apparatus 1310 capable of capturing an image.

Next, at operation S142, the processor 1305 identifies an area 102 of the screen within the capture image 133.

According to one embodiment, the processor 1305 may display a guide UI (see '171' of FIG. 18 and '181' of FIG. 19) in a boundary portion of the screen 1301 so that the area 102 of the screen can be recognizable. The guide UI 171 may for example be materialized by a marker having various shapes and colors.

Thus, the area 102 of the screen is recognizable through the guide UI 171 from the capture image 133 taken by the mobile apparatus and the like external apparatus 1310.

At operation S143, the processor 1305 samples a plurality of patch images having a predetermined unit size from the background area 132 surrounding the area 102 of the screen identified within the capture image 133.

Next, at operation S144, the processor 1305 generates a screen image to be displayed on the screen 1301 based on the plurality of sampled patch images. Here, the operation S144 may include an operation of generating a screen image using a patch image selected among the plurality of patch images, based on similarity in pattern between the plurality of patch images sampled in the operation S143 and the background area 132.

According to one embodiment, the operation S144 may include operations of identifying a space between the plurality of same repeating patterns in the background area 132, and generating a screen image based on the pattern and the space.

According to one embodiment, the operation S144 may include operations of identifying the first boundary lines 121 and 122 involved in the background area 132, and generating a screen image so that the second boundary line 123 to be involved in the screen image can be aligned with the first boundary lines 121 and 122.

According to one embodiment, the operation S144 may further include an operation of calibrating the colors of the screen image based on difference in RGB values between the between the background area 132 and the area 102 of the screen.

According to one embodiment, the operation S144 may further include an operation of displaying a UI 105 for guiding a process of generating the screen image while generating the screen image.

Last, at operation S145, the processor 1305 processes the generated screen image to be displayed on the screen 1301.

Figure 15:
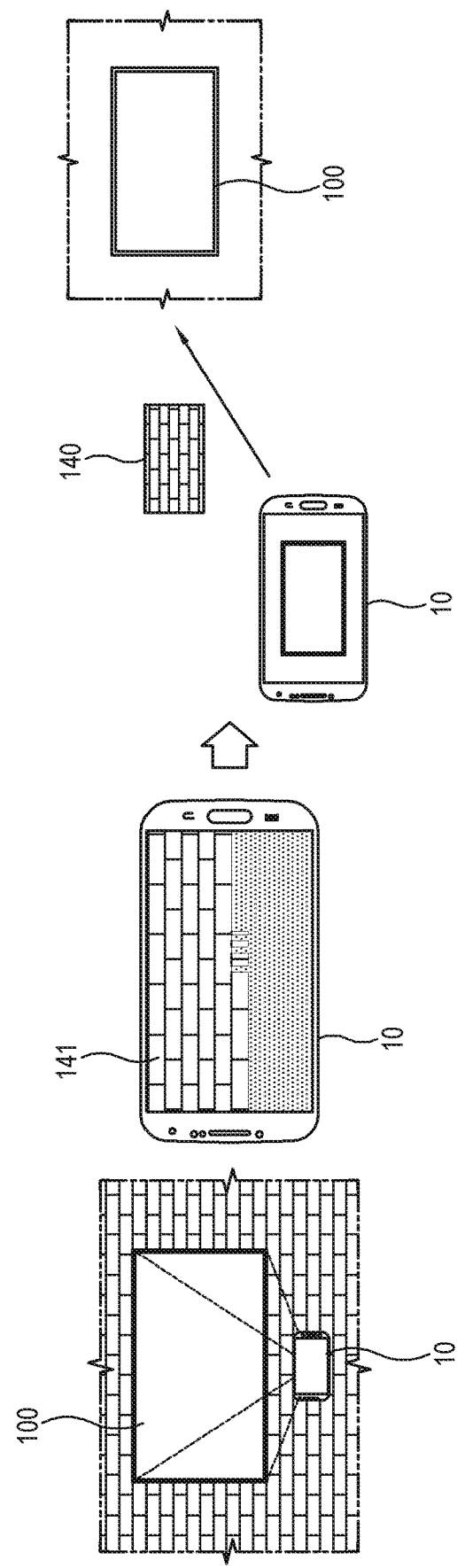
FIG. 15 illustrates an example that a mobile apparatus generates and provides a screen image to a TV according to an embodiment.

FIG. 15 illustrates an example that a mobile apparatus generates and provides a screen image to a TV according to an embodiment. As shown in FIG. 15, the mobile apparatus 10 first acquires the capture image 133 taken of the screen 101 of the TV 100 and the wall around the screen 101.

The mobile apparatus 10 recognizes the area 102 of the screen from the taken capture image 133, and samples a plurality of patch images 91, 92, . . . from the background area 132 surrounding the recognized area 102 of the screen.

The mobile apparatus 10 generates a screen image 140 based on the plurality of sampled patch images 91, 92, . . . . In this case, the mobile apparatus 10 displays a UI 141 for guiding a generation process so that a user can directly and visually check the process of generating the screen image 140 while the screen image 140 is generated.

According to one embodiment, the generation process of the screen image 140 may be displayed through the UI 140 in such a manner that the plurality of patch images are sequentially arranged and attached from the left top in the screen of the mobile apparatus 10. In this case, the UI 140 may be displayed having a size corresponding to the full area or a partial area of the screen.

The mobile apparatus 10 transmits the screen image 140 generated by the foregoing method to the TV 100, so that the screen image 140 can be output to the screen 101 of the TV 100.

Figure 16:
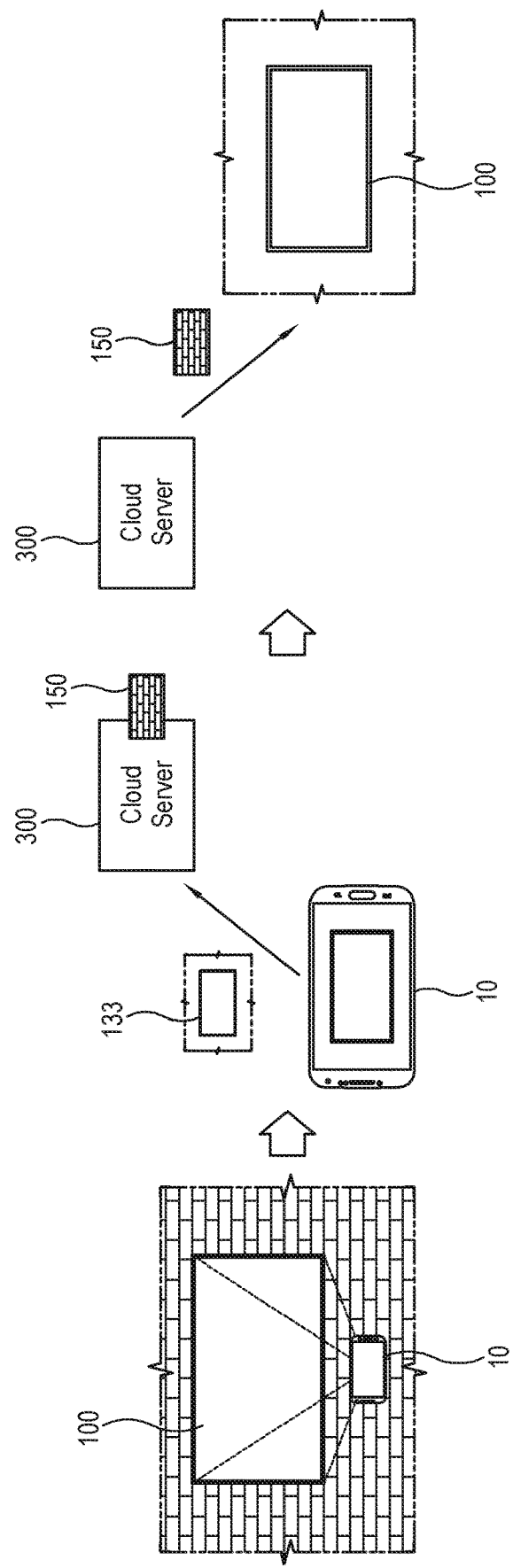
FIG. 16 illustrates an example that a cloud server generates and provides a screen image to a TV according to an embodiment.

FIG. 16 illustrates an example that a cloud server generates and provides a screen image to a TV according to an embodiment. As shown in FIG. 16, the mobile apparatus 10 first acquires a capture image 133 taken of the screen 101 of the TV 100 and the wall around the screen 101.

The mobile apparatus 10 transmits the taken capture image 133 to a cloud server 300, and the cloud server 300 uses the capture image 133 received from the mobile apparatus 10 to generate a screen image 150. In this case, the cloud server 300 generates the screen image 150 from the capture image 133 by the same method as the mobile apparatus 10 of FIG. 15 generates the screen image 140, and thus repetitive descriptions thereof will be avoided.

The cloud server 300 transmits the screen image 150 generated by the foregoing method to the TV 100, so that the screen image 150 can be output to the screen 101 of the TV 100.

Figure 17:
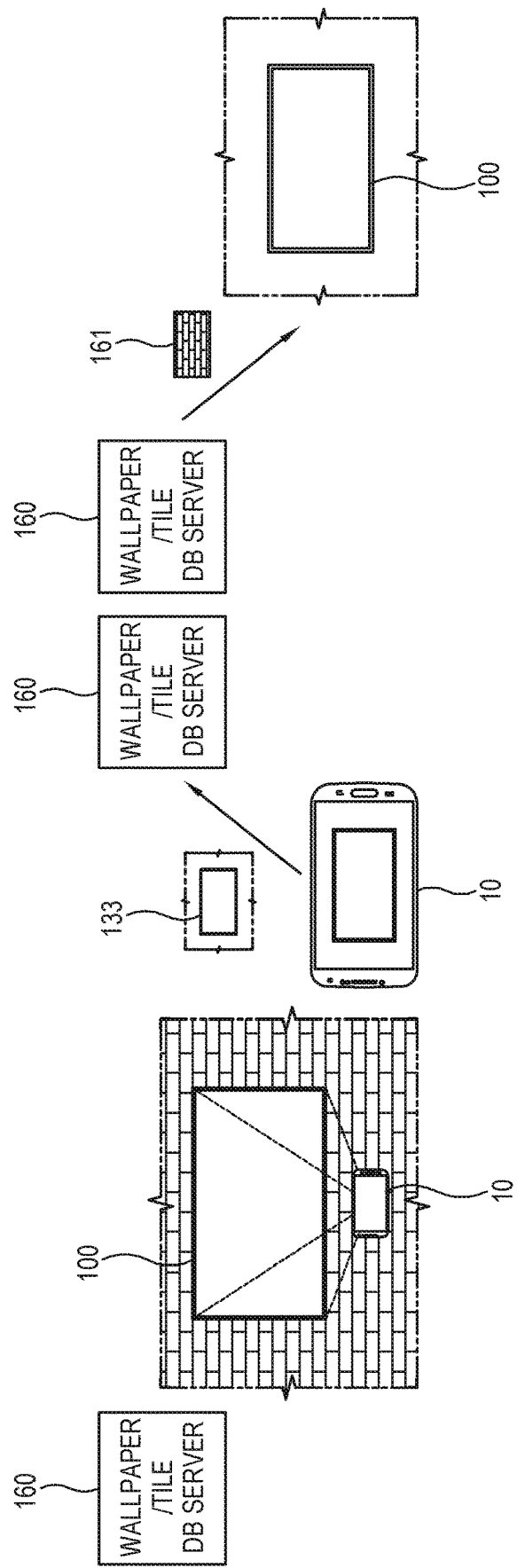
FIG. 17 illustrates an example of generating a screen image with a wallpaper/tile database (DB) according to an embodiment.

FIG. 17 illustrates an example of generating a screen image with a wallpaper/tile database (DB) according to an embodiment. As shown in FIG. 17, the mobile apparatus 10 acquires a capture image 133 taken of the screen 101 of the TV 100 and the wall around the screen 101.

The mobile apparatus 10 transmits the taken capture image 133 to a wallpaper/tile DB server 160. In this case, the wallpaper/tile DB server 160 may be achieved in association with a manufacturer for a wallpaper, a tile or the like, or may be achieved by its own collection.

The mobile apparatus 10 determines whether an image corresponding to the background area 132 within the capture image 133 transmitted to the wallpaper/tile DB server 160 matches with one searched among pattern images stored in a wallpaper/tile DB, and directly receives a matching pattern image 161 from the wallpaper/tile DB server 160 or transmits the matching pattern image 161 to the TV 100 when the matching pattern image 161 is present.

According to one embodiment, when the mobile apparatus 10 directly receives the pattern image 161 from the wallpaper/tile DB server 160, a screen image is generated using the received pattern image 161 and transmitted to the TV 100 so that the screen image can be output to the screen 101.

According to one embodiment, when the pattern image 161 searched through the wallpaper/tile DB server 160 is transmitted to the TV 100, the TV 100 may generate a screen image based on the received pattern image 161 and output the screen image to the screen 101.

According to another embodiment, the pattern image may be acquired through not the wallpaper/tile DB server 160 but a search service using the Internet.

The mobile apparatus 10 transmits an image corresponding to the background area 132 within the capture image 133 to a server that provides an image search service, and receives a corresponding pattern image from the mobile apparatus 10 or the TV 100 when there is a wallpaper/tile image matching with a search result of the server.

The mobile apparatus 10 may directly generate a screen image based on the pattern image provided from the search service server and then transmit the generated screen image to the TV 100. In a case of receiving the pattern image from the TV 100, the TV 100 may generate and display the screen image on the screen 101.

FIG. 18 illustrates an example of a method of recognizing a TV screen according to an embodiment. As shown in FIG. 18, various embodiments may be given so that the area 102 of the screen can be distinguished in the capture image 133 taken using the mobile apparatus 10.

According to one embodiment, the TV 100 may display the guide UI 171 in a boundary portion of the screen 101. The guide UI 171 may be achieved by a marker having various shapes and colors, and a portion where the guide UI 171 is displayed may be recognized as an edge of the screen 101 through image processing from the capture image 133 taken by the mobile apparatus 10. Thus, the inside of the portion recognized as the edge through the guide UI 171 may be defined as the area 102 of the screen.

Here, the guide UI 171 may be automatically generated and displayed in the TV 100, or may be transmitted from the mobile apparatus 10 and displayed on the TV 100.

According to one embodiment, a bezel area 172 of the screen 101 in the TV 100 is recognizable through the image processing from the capture image 133 taken by the mobile apparatus 10. In this case, the recognized bezel area 172 may be determined as the edge of the screen 101, and the inside of the edges may be defined as the area 102 of the screen.

According to one embodiment, a physical marker 173 may be attached to the wall to which the screen 101 of the TV 100 is installed to recognize the area 102 of the screen.

For example, the physical markers 173 are attached to the positions on the wall corresponding to the four corners of the screen 101, and the markers 173 are recognizable through the image processing from the capture image 133 taken using the mobile apparatus 10. In this case, the edge of the screen 101 is recognized based on a relative position to the recognized markers 173, and the inside of the edge may be identified as the area 102 of the screen.

Figure 19:
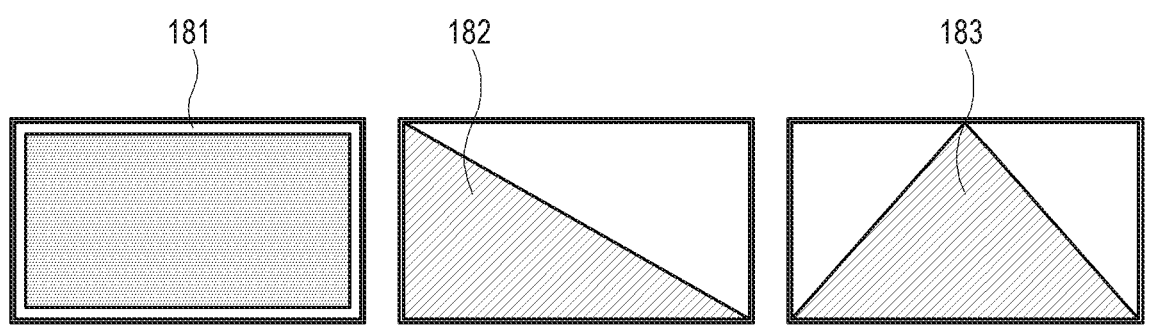
FIG. 19 illustrates an example of a method of recognizing a TV screen according to an embodiment.

FIG. 19 illustrates an example of a method of recognizing a TV screen according to an embodiment. As shown in FIG. 19, the guide UI may be displayed with various shapes and colors on the screen 101 of the TV 100 so that the area 102 of the screen can be distinguished from the capture image 133 taken using the mobile apparatus 10.

According to one embodiment, the edges of the screen 101 are marked with a maker 181 shaped like a white line, and the inside of the marker 181 is colored by gray. Thus, the marker 181 is recognized from the capture image 133 taken by the mobile apparatus 10, and a gray area surrounded by the marker 181 is identified as the area 102 of the screen.

As an alternative to the foregoing embodiment that the guide UI is displayed at the edge of the screen 101, an area of the screen 101 may be filled with a color.

For example, a maker 182 may be provided in the form of a blue right-triangle formed by a diagonal line and two sides in the screen 101. Alternatively, a maker 183 may be provided in the form of a blue triangle formed by connecting a center point of a top side and opposite vertices of the bottom side in the screen 101.

As described above, when the guide UI 182 or 183 is provided in the form of filling the area of the screen 101 with the color, a quadrangular area including the guide UI 182 or 183 may be identified as the area 102 of the screen.

Figure 20:
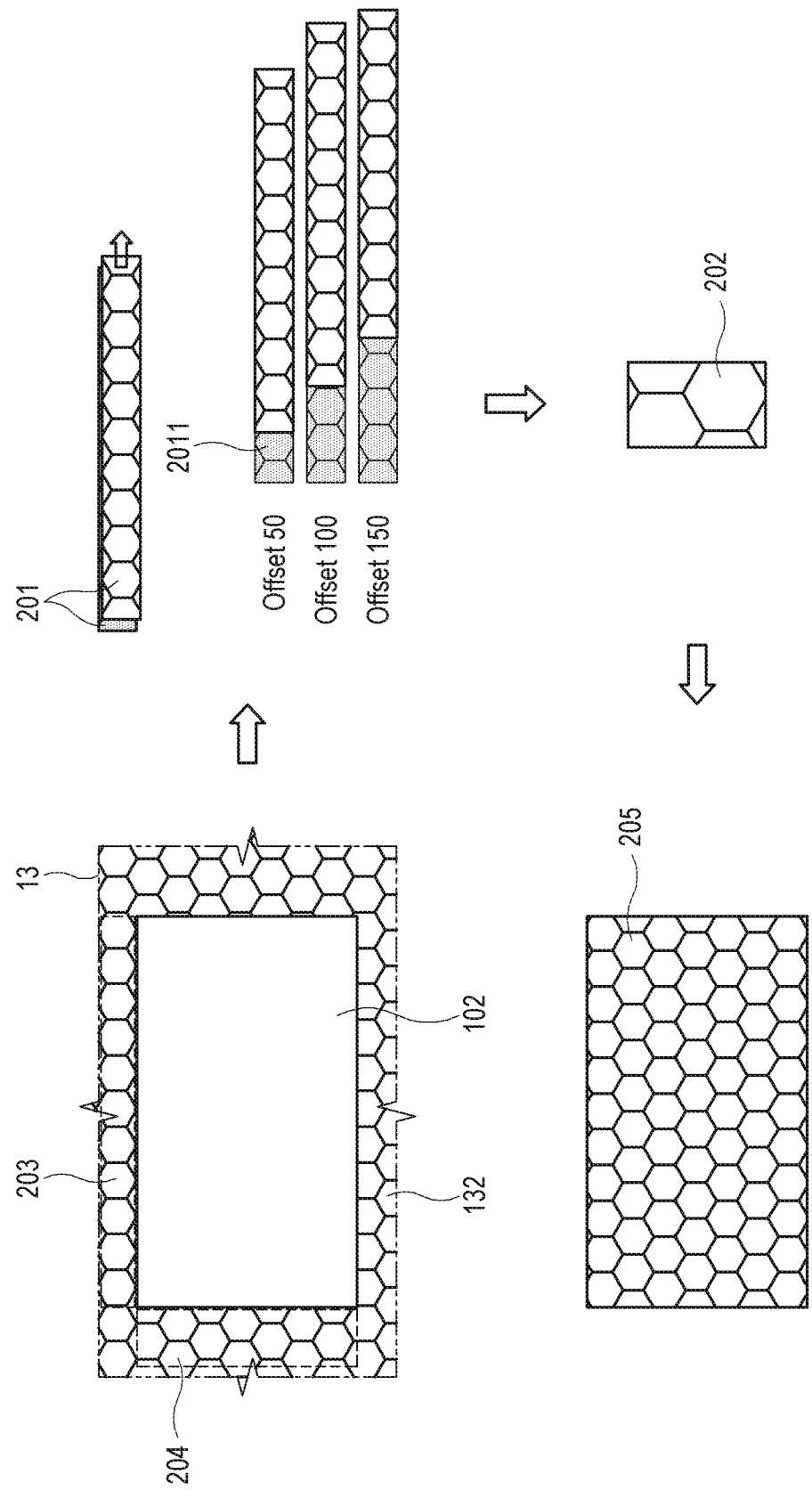
FIG. 20 illustrates an example of identifying a minimum unit of a repeating pattern and generating a screen image from a background area according to an embodiment.

FIG. 20 illustrates an example of identifying a minimum unit of a repeating pattern and generating a screen image from a background area according to an embodiment. The illustrated example shows one embodiment of a pattern generation method in the operation S52 of FIG. 5.

As shown in FIG. 20, to generate a pattern similar to the wall around the screen 101, the processor 15 identifies the size of a repeating pattern minimum unit 202 from the background area 132 of the capture image 133, and puts the pattern minimum units 202 of the identified size together into a screen image 205.

According to one embodiment, the processor 15 samples a horizontal pattern image 201 from a horizontal pattern scan area 203 above or below the area 102 of the screen within the background area 132. The processor 15 duplicates the sampled horizontal pattern image 201 to generate two same horizontal pattern images 201, and performs a similarity scan while moving the two overlapped horizontal pattern images 201 in units of pixel in a horizontal direction.

Like this, when all the pixels are fully scanned in the horizontal direction by the two horizontal pattern images 201, a high similarity section repetitively appears and the processor 15 calculates a pixel offset in the repetitive sections, thereby obtaining a repeating horizontal pattern minimum unit 2011. In the illustrated example, the horizontal pattern minimum unit 2011 has a size corresponding to a pixel offset of '50'.

Like the horizontal direction, the processor 15 may acquire a repeating vertical pattern minimum unit with respect to a vertical direction from a vertical pattern scan area 204 in the left or right of the area 102 of the screen within the background area 132.

The processor 15 may acquire a pattern minimum unit 202 for generating the screen image 205 based on each size, i.e., pixel offset, of the horizontal pattern minimum unit 2011 and the vertical pattern minimum unit acquired as above.

For example, when the horizontal pattern minimum unit 2011 has a pixel offset of '50' and the vertical pattern minimum unit has a pixel offset of '70', a repeating pattern minimum unit 202 having a size of '50*70' is sampled from the left top of the background area 132.

The processor 15 may generate a screen image 205 having a similar pattern to the wall around the screen 101 in such a manner that the pattern minimum units 202 sampled as above are put together in the horizontal and vertical directions.

Figure 22:
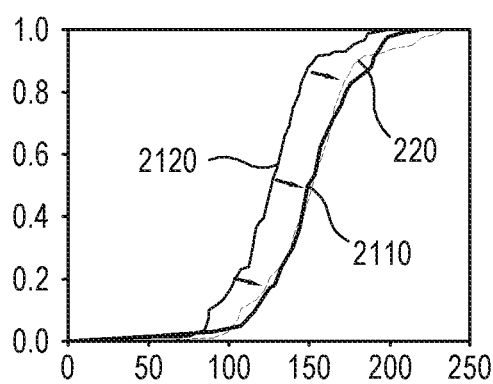

FIGS. 21 and 22 illustrate an example of using cumulative histogram matching for color calibration of a screen image according to an embodiment. The illustrated example shows one embodiment of an operation for performing color calibration in the operations S521 or S54.

As shown in FIG. 21, for the color calibration, the processor 15 samples a plurality of reference pixel images 211 from the background area 132, and samples a plurality of source pixel images 212 from the area 102 of the screen.

The processor 15 generates cumulative histograms 213, 214 and 215 with regard to respective pieces of R, G and B data of the plurality of sampled reference pixel images 211 and source pixel images 212. In this case, the cumulative histograms 213, 214 and 215 of the respective pieces of the R, G and B data are represented with a reference line 2110 corresponding to a reference pixel image 211, and a source line 2120 corresponding to a source pixel image 212.

As shown in FIG. 22, the processor 15 may for example employ a linear regression model estimation method to estimate a fitting line 220 for fitting the source line 2120 to the reference line 2110 with respect to each of the cumulative histograms 213, 214 and 215.

A linear regression equation 223 for estimating the fitting line 220 is as follows.

$$X\text{ref}=m*X\text{src}+b$$

where, Xsrc is a pixel value of the source pixel image 212, Xref is a pixel value of the reference pixel image 211, and m and b are respectively a gradient and an intercept of the linear regression equation 223.

According to one embodiment, as an estimation method of the linear regression equation 223, a gradient descent method may be for example used to estimate a fitting line 220 approximate to the reference line 2110. The gradient descent method refers to a method of searching parameters (m, b) to get a minimum difference between a value of real data and data estimated by the linear regression equation 223.

For example, the gradient (m) and the intercept (b) of the linear regression equation 223 may be estimated using the differential equation 224 of FIG. 22.

By applying the linear regression equation 223 estimated as above to the source pixel image 212, the color of the source pixel image 212 displayed on the area 102 of the screen is calibrated to have similar color to the reference pixel image 211 of the background area 132.

In association with the color calibration of the screen image, the following embodiments are applicable.

According to one embodiment, the processor 15 compares a difference in colors, i.e., a difference in RGB values between the initially taken capture image 133 and a screen image generated to have a similar pattern to the wall around the screen 101, and applies additional color calibration to the generated screen image when the difference in colors is greater than a predetermined range.

According to one embodiment, the processor 15 may apply additional color calibration to the generated screen image in accordance with installation environments or apparatuses, for example, by taking differences in lighting, characteristics of a display panel, characteristics of a backlight unit, etc. into account.

For example, the processor 15 may recapture the screen image, which is being displayed on the screen 101 of the TV 100 after being generated to have a pattern and a color similar to those of the surrounding wall, and apply the color calibration to the recaptured screen image. That is, the recaptured screen image may be for example changed in lighting, characteristics of the display panel, characteristics of the backlight unit, etc. as compared with those of the capture image 130 taken before generating the screen image, and therefore the color calibration is performed to reflect such a change.

By the foregoing methods, changes according to installation environments and apparatuses are taken into account when a screen image is generated to have a pattern and a color similar to those of the surrounding wall, thereby performing more precise color calibration.

According to one embodiment, the processor 15 may perform additional color calibration by taking change in surrounding environments into account after generating the screen image.

For example, the electronic apparatus 10 may include a built-in illuminometer or use an illuminometer provided outside the apparatus, thereby measuring brightness of the surrounding environments.

In this case, the processor 15 measures the brightness when the screen image is generated and the brightness after a predetermined period of time elapses from the generation of the screen image, through the illuminometer, and applies the color calibration to the screen image in consideration of the brightness measured after generating the screen image when the brightness increases or decreases more than a predetermined range.

For example, when the screen image is generated in bright daytime but displayed on the TV 100 in dark evening time, the screen image generated in the daytime may be brighter than the wall without having similar brightness to the wall. In this case, the generated screen image is calibrated to become darker by reflecting conditions of brightness darker than that of when the screen image is generated, thereby eliminating disharmony with the surrounding wall.

When there is a change in brightness and the like surrounding environments after generating the screen image, such a change is taken into account to generate a screen image similar to the surrounding wall by the foregoing method.

As described above, the mobile apparatus uses only a minimum background image around a TV screen to thereby provide a TV image similar to a surrounding background.

Further, a user's control is minimized through the mobile apparatus in terms of providing a TV image similar to the surrounding background.

Further, the mobile apparatus is used to provide a TV image similar to the surrounding background, and thus the TV screen is expected to have an invisible effect.

Although a few embodiments have been shown and described, it will be appreciated by those skilled in the art that changes may be made in these embodiments without departing from the principles and spirit of the inventive concepts, the scope of which is defined in the appended claims and their equivalents.

REFERENCE NUMERALS

10, 1300: electronic apparatus
11: image capturer
12, 1302: image processor
13, 1303: display
102: area of screen
131: capture guide UI
132: background area
133: capture image
14, 1304: communicator
15, 1305: processor
16, 1306: user input
100: display apparatus
101, 1301: screen
1310: external apparatus
171, 181, 182, 183: guide UI

What is claimed is:

1. An electronic apparatus comprising:
   a communicator;
   an image capturer configured to acquire a capture image of a display apparatus comprising a screen; and
   a processor configured to:
   identify a screen area of the screen, within the capture image;
   sample a plurality of patch images, each of which having a predetermined unit size, from a background area outside the screen area within the capture image;
   generate a screen image to be displayed on the screen, based on the plurality of patch images; and
   control the communicator to transmit the screen image to the display apparatus,
   wherein the processor is further configured to generate the screen image by selecting one by one from among the plurality of patch images and arranging the selected patch images.

2. The electronic apparatus according to claim 1, wherein the processor is further configured to compensate the screen image so that attributes of the screen image match with attributes of an image of the background area.

3. The electronic apparatus according to claim 1, wherein the processor is further configured to:
   identify a space between a plurality of same patterns that is repeated in the background area; and
   generate the screen image, based on the plurality of same patterns and the space.

4. The electronic apparatus according to claim 1, wherein the processor is further configured to:
   identify a first boundary line included in the background area; and
   generate the screen image so that a second boundary line included in the screen image is aligned with the first boundary line.

5. The electronic apparatus according to claim 1, wherein the processor is further configured to calibrate a color of the screen image, based on a difference in RGB values between the screen area and the background area.

6. The electronic apparatus according to claim 1, further comprising a display,
   wherein the processor is further configured to control the display to display a user interface (UI) for guiding a generation process of the screen image, while the screen image is being generated.

7. The electronic apparatus according to claim 1, further comprising a display,
wherein the processor is further configured to control the display to display a capture guide user interface (UI) for guiding a position at which the screen is aligned.

8. The electronic apparatus according to claim 7, wherein the processor is further configured to control the display to a warning message, based on a position at which the screen is displayed being deviated from the capture guide UI.

9. A non-transitory computer-readable storage medium storing instructions configured to cause a processor to:
receive a capture image of a display apparatus comprising a screen;
identify a screen area of the screen, within the capture image;
sample a plurality of patch images, each of which having a predetermined unit size, from a background area outside the screen area within the capture image;
generate a screen image to be displayed on the screen, based on the plurality of patch images; and
control a communicator to transmit the screen image to the display apparatus,
wherein the instructions are further configured to generate the screen image by selecting one by one from among the plurality of patch images and arranging the selected patch images.

10. The non-transitory computer-readable storage medium according to claim 9, wherein the instructions are further configured to cause the processor to compensate the screen image so that attributes of the screen image match with attributes of an image of the background area.

11. A method of controlling an electronic apparatus, the method comprising
receive a capture image of a display apparatus comprising a screen;
identifying a screen area of the screen, within the capture image;
sampling a plurality of patch images, each of which having a predetermined unit size, from a background area outside of the screen area within the capture image;
generating a screen image to be displayed on the screen, based on the plurality of patch images; and
controlling a communicator to transmit the screen image to the display apparatus,
wherein the generating the screen image comprises generating the screen image by selecting one by one from among the plurality of patch images and arranging the selected patch images.

12. The method according to claim 11, further comprising compensating the screen image so that attributes of the screen image match with attributes of an image of the background area.

13. The method according to claim 11, wherein the generating of the screen image comprises:
identifying a space between a plurality of same patterns that is repeated in the background area; and
generating the screen image, based on the plurality of same patterns and the space.

14. An electronic apparatus comprising:
a communicator;
a display comprising a screen; and
a processor configured to:
receive, via the communicator, a capture image of the display, from an external apparatus capable of acquiring the capture image;
identify a screen area of the screen, within the capture image,
sample a plurality of patch images, each of which having a predetermined unit size, from a background area outside of the screen area within the capture image,
generate a screen image to be displayed on the screen, based on the plurality of sampled patch images; and
control the display to display the screen image on the screen,
wherein the processor is further configured to generate the screen image by selecting one by one from among the plurality of patch images and arranging the selected patch images.

15. The electronic apparatus according to claim 14, wherein the processor is further configured to compensate the screen image so that attributes of the screen image match with attributes of an image of the background area.

16. The electronic apparatus according to claim 14, wherein the processor is further configured to control the display to display a guide user interface (UI) for distinguishing the screen area that is displayed on the display.

17. A method of controlling an electronic apparatus, the method comprising:
receiving a capture image of a display of the electronic apparatus, from an external apparatus capable of acquiring the capture image;
identifying a screen area of a screen of the display, within the capture image;
sampling a plurality of patch images, each of which having a predetermined unit size, from a background area outside of the screen area within the capture image;
generating a screen image to be displayed on the screen, based on the plurality of sampled patch images; and
controlling a display to display the screen image on the screen,
wherein the generating the screen image comprises generating the screen image by selecting one by one from among the plurality of patch images and arranging the selected patch images.

* * * * *